(12) United States Patent
Choi et al.

(10) Patent No.: US 10,075,277 B2
(45) Date of Patent: Sep. 11, 2018

(54) METHOD AND APPARATUS FOR TRANSMITTING CONTROL CHANNEL IN INTRA-CELL CARRIER AGGREGATION SYSTEM

(71) Applicant: Samsung Electronics Co., Ltd., Suwon-si, Gyeonggi-do (KR)

(72) Inventors: Seunghoon Choi, Gyeonggi-do (KR); Youngbum Kim, Seoul (KR); Joonyoung Cho, Gyeonggi-do (KR); Hyoungju Ji, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/830,910

(22) Filed: Dec. 4, 2017

(65) Prior Publication Data
US 2018/0091279 A1    Mar. 29, 2018

Related U.S. Application Data

(63) Continuation of application No. 15/369,567, filed on Dec. 5, 2016, which is a continuation of application
(Continued)

(30) Foreign Application Priority Data

Jan. 25, 2013  (KR) .................. 10-2013-0008613

(51) Int. Cl.
*H04J 3/00*     (2006.01)
*H04L 5/00*     (2006.01)
(Continued)

(52) U.S. Cl.
CPC .......... *H04L 5/0055* (2013.01); *H04J 3/1694* (2013.01); *H04L 1/1812* (2013.01);
(Continued)

(58) Field of Classification Search
USPC ........................................ 370/280
See application file for complete search history.

(56) References Cited

U.S. PATENT DOCUMENTS

| | | |
|---|---|---|
| 2011/0138244 A1 | 6/2011 | Zhu et al. |
| 2011/0149774 A1 | 6/2011 | Chen et al. |

(Continued)

FOREIGN PATENT DOCUMENTS

| | | |
|---|---|---|
| CN | 102656836 A | 9/2012 |
| CN | 102687451 A | 9/2012 |
| WO | 2012091532 A2 | 7/2012 |
| WO | 2012108718 A2 | 8/2012 |

OTHER PUBLICATIONS

US 9,838,183, 12/2017, Choi et al. (withdrawn)*
(Continued)

*Primary Examiner* — Mohammad Anwar
*Assistant Examiner* — Angel Brockman

(57) ABSTRACT

The present disclosure relates to a method and an apparatus for transmitting a control channel in an intra-cell carrier aggregation system. The method includes establishing a connection with a base station through a Primary cell (Pcell) of a Time Division Duplex (TDD) scheme and a Secondary cell (Scell) of a Frequency Division Duplex (FDD) scheme. The method also includes receiving data through the Scell before a timing configured as an uplink sub-frame according to a TDD UpLink-DownLink (UL-DL) configuration of the Pcell. The method also includes transmitting a feedback of the received data through the Pcell in a feedback sub-frame. By the method, a feedback for a data can be effectively transferred.

16 Claims, 29 Drawing Sheets

Related U.S. Application Data

No. 14/165,397, filed on Jan. 27, 2014, now Pat. No. 9,515,758.

(51) Int. Cl.
  *H04W 72/04* (2009.01)
  *H04L 5/14* (2006.01)
  *H04L 1/18* (2006.01)
  *H04J 3/16* (2006.01)
  *H04W 28/10* (2009.01)

(52) U.S. Cl.
  CPC ............ *H04L 5/001* (2013.01); *H04L 5/1415* (2013.01); *H04L 5/1469* (2013.01); *H04W 72/042* (2013.01); *H04W 72/0413* (2013.01); *H04J 3/00* (2013.01); *H04W 28/10* (2013.01)

(56) References Cited

U.S. PATENT DOCUMENTS

| | | | |
|---|---|---|---|
| 2012/0155337 A1* | 6/2012 | Park | H04L 1/1692 370/280 |
| 2013/0258914 A1 | 10/2013 | Seo et al. | |
| 2013/0322343 A1 | 12/2013 | Seo et al. | |
| 2013/0343239 A1* | 12/2013 | Damnjanovic | H04L 5/001 370/280 |

OTHER PUBLICATIONS

Communication from a foreign patent office in a counterpart foreign application, "Notification of the First Office," Chinese Application No. 201480016923A, Nov. 27, 2017, 11 pages.

* cited by examiner

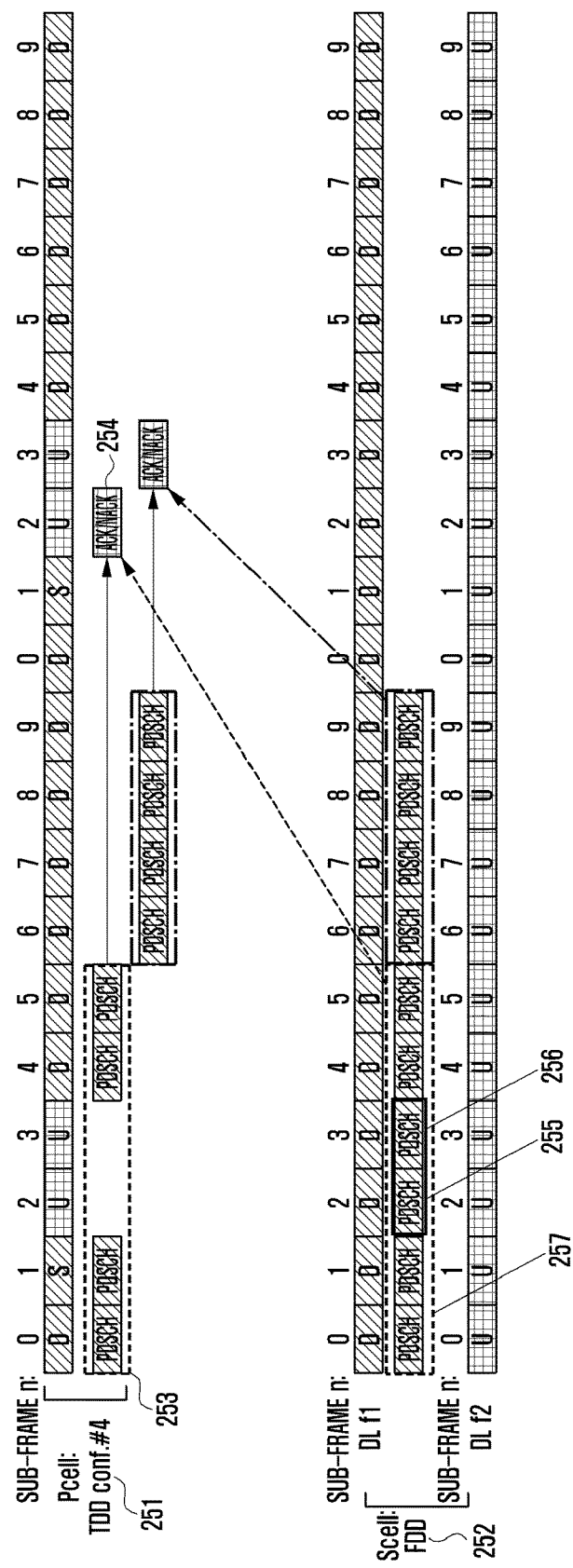

METHOD AND APPARATUS FOR TRANSMITTING CONTROL CHANNEL IN INTRA-CELL CARRIER AGGREGATION SYSTEM

CROSS-REFERENCE TO RELATED APPLICATION(S) AND CLAIM OF PRIORITY

The present application is a continuation of U.S. patent application Ser. No. 15/369,567, filed on Dec. 5, 2016, which is a continuation of U.S. patent application Ser. No. 14/165,397, filed on Jan. 27, 2014, which claims the benefit under 35 U.S.C. § 119(a) of Korean Patent Application No. 10-2013-0008613, filed on Jan. 25, 2013, the disclosures of which are hereby incorporated by reference into the present disclosure as if fully set forth herein.

TECHNICAL FIELD

The present disclosure relates to a method and an apparatus for transmitting a control channel in an intra-cell carrier aggregation system.

BACKGROUND

In general, a mobile communication system was developed to provide voice services while guaranteeing activity of users. However, the mobile communication systems have extended their fields to the data providing service beyond the voice communication providing service and have now developed up to a level at which they can provide a high speed data service. In spite of such a development, current mobile communication systems are undergoing a deficiency of resources and users of current mobile communication systems require a service of a higher speed.

Long Term Evolution-Advanced (LTE-A) in the 3rd Generation Partnership Project (3GPP) is a technology implementing a high speed packet-based communication having a transmission speed of a maximum of 1 Gbps. The LTE-A employs a scheme which increases the number of cells accessible by a mobile station while allowing feedbacks occurring in respective cells to be transmitted in only a Primary cell (P cell or Pcell). Further, in the LTE-A, all the cells accessible by a mobile station have the same duplex structure. Therefore, all the cells may have a Frequency Division Duplex (FDD) structure or may have a Time Division Duplex (TDD) structure. The TDD structure may be a static TDD structure in which a UL-DL configuration is maintained or a dynamic TDD structure in which the UL-DL configuration is changed by system information, a higher layer signal, or a downlink common control channel.

If one cell controlled by a base station has an FDD structure and a single frequency band is added, it is easy to apply a TDD structure to the single frequency band. It is because two different frequency bands are required for the downlink and the uplink, respectively, in order to operate an FDD structure.

Therefore, there is a necessity for a scheme for transmitting a control channel for data transmitted from a plurality of cells when the cells have different duplex schemes due to the addition of limited frequency bands as described above or other reasons. In relation to an uplink control channel for downlink data, when feedbacks for a plurality of cells are allowed to be transmitted only in a Pcell, a mobile station requires a technology for transmitting feedbacks of cells having different frame structures in Pcell. Further, in relation to a downlink control channel for uplink data, there is a necessity for a technology in which a base station can schedule uplink data to a mobile station and transmits a downlink control channel for the uplink data to the mobile station.

SUMMARY

To address the above-discussed deficiencies, it is a primary object to provide a method and a system for transmitting a control channel when cells have different duplex structures in an intra-cell carrier aggregation system.

In accordance with an aspect of the present disclosure, there is provided a feedback method of a mobile station connected with a base station through a Primary cell (Pcell) of a Time Division Duplex (TDD) scheme and a Secondary cell (Scell) of a Frequency Division Duplex (FDD) scheme. The feedback method includes receiving data through the Scell before a timing configured as an uplink sub-frame according to a TDD UpLink-DownLink (UL-DL) configuration of the Pcell. The feedback method also includes transmitting a feedback of the received data through the Pcell in a feedback sub-frame. The sub-frames of data, the feedback of which is to be transmitted in the feedback sub-frame, among the received data, are selected based on a sub-frame number of the feedback sub-frame and the TDD UL-DL configuration of the Pcell.

In accordance with another aspect of the present disclosure, there is provided a mobile station transmitting a feedback, which includes a communication unit configured to establish a connection with a base station through a Primary cell (Pcell) of a Time Division Duplex (TDD) scheme and a Secondary cell (Scell) of a Frequency Division Duplex (FDD) scheme, and receive data through the Scell before a timing configured as an uplink sub-frame according to a TDD UpLink-DownLink (UL-DL) configuration of the Pcell. The mobile station also includes a controller configured to control the communication unit to transmit a feedback of the received data through the Pcell in a feedback sub-frame. The sub-frames of data, the feedback of which is to be transmitted in the feedback sub-frame, among the received data, are selected based on a sub-frame number of the feedback sub-frame and the TDD UL-DL configuration of the Pcell.

In accordance with another aspect of the present disclosure, there is provided a feedback receiving method of a base station connected with a mobile station through a Primary cell (Pcell) of a Time Division Duplex (TDD) scheme and a Secondary cell (Scell) of a Frequency Division Duplex (FDD) scheme. The feedback receiving method includes transmitting data through the Scell before a timing configured as an uplink sub-frame according to a TDD UL-DL configuration of the Pcell. The feedback receiving method also includes receiving a feedback of the transmitted data through the Pcell in a feedback sub-frame. The feedback received in the feedback sub-frame comprises feedbacks of data transmitted in sub-frames selected based on a sub-frame number of the feedback sub-frame and the TDD UL-DL configuration of the Pcell.

In accordance with another aspect of the present disclosure, there is provided a base station receiving a feedback, which includes a communication unit configured to establish a connection with a mobile station through a Primary cell (Pcell) of a Time Division Duplex (TDD) scheme and a Secondary cell (Scell) of a Frequency Division Duplex (FDD) scheme, and transmit data through the Scell before a timing configured as an uplink sub-frame according to a TDD UL-DL configuration of the Pcell. The base station also includes a controller configured to control the communication unit to receive a feedback of the transmitted data through the Pcell in a feedback sub-frame. The feedback received in the feedback sub-frame comprises feedbacks of data transmitted in sub-frames selected based on a sub-frame number of the feedback sub-frame and the TDD UL-DL configuration of the Pcell.

According to an embodiment of the present disclosure, a mobile station and a base station can transmit and receive a control channel necessary for data scheduling.

Further, according to an embodiment of the present disclosure, it is possible to enable simultaneous data transmission and reception through cells having different duplex schemes, so as to raise the maximum transmission rate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 2A to 2G illustrate control channel transmission according to the an embodiment of the present disclosure;

DETAILED DESCRIPTION

Figure 1A:
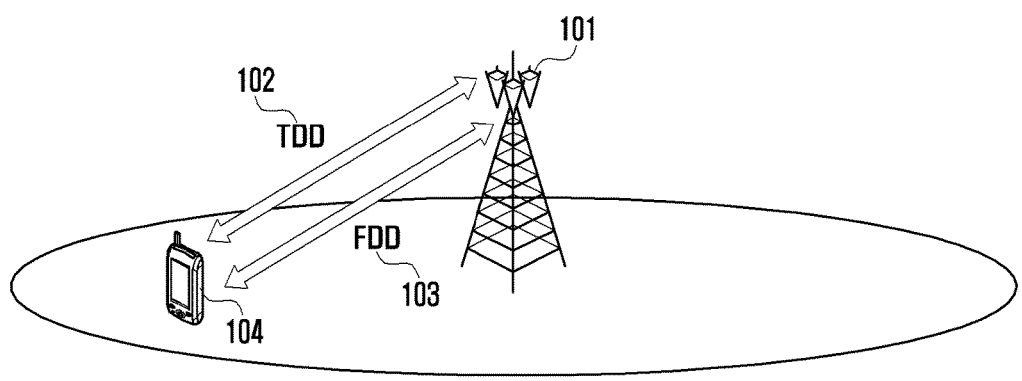
FIGS. 1A and 1B illustrate communication systems to which some embodiments of the present disclosure are applied.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged systems and methods. Hereinafter, example embodiments of the present disclosure will be described in detail with reference to the accompanying drawings. Further, in the following description of the present disclosure, a detailed description of known functions and configurations incorporated herein will be omitted when it may make the subject matter of the present disclosure rather unclear. Then, terms described later are defined in consideration of the functions of the present disclosure, but may vary according to the intention or convention of a user or operator. Therefore, the definitions of the terms should be determined based on the contents throughout the specification.

Although embodiments of the present disclosure are described are described based on a Long Term Evolution (LTE) system and an LTE-Advanced (LTE-A) system as an example in the present specification, the present disclosure can be applied without making any adjustment to other communication systems employing base station scheduling.

The Orthogonal Frequency Division Multiplexing (OFDM) transmission scheme is a data transmission scheme using a multi-carrier, and a kind of Multi-Carrier Modulation (MCM) scheme, in which serially input symbol strings are converted in parallel, and the respective converted symbol strings are modulated with a plurality of mutually orthogonal sub-carriers, that is, a plurality of mutually orthogonal sub-channels, and are then transmitted.

In the OFDM scheme, a modulation signal is located at a second-dimensional resource configured by the time and the frequency. Resources on the time axis are distinguished from each other by different OFDM symbols, which are orthogonal to each other. Resources on the frequency axis are distinguished from each other by different sub-carriers, which are also orthogonal to each other. That is, in the OFDM scheme, by appointing a particular OFDM symbol on the time axis and appointing a particular sub-carrier on the frequency axis, it is possible to indicate one minimum unit resource, which is referred to as a Resource Element (RE). Different REs are orthogonal even after passing a frequency selective channel. Therefore, signals transmitted through different REs can be received by a receiver without causing interference with each other.

A physical channel is a channel of a physical layer for transmitting a modulation symbol obtained by modulating one or more encoded bit strings. In an Orthogonal Frequency Division Multiple Access, (OFDMA) system, an information string is transmitted by configuring a plurality of physical channels according to the use of the information string or a receiver for receiving the information string. Which RE one physical channel should be located on for transmission should be promised in advance between a transmitter and a receiver, and a rule for the same is referred to as "mapping".

In an OFDM communication system, a downlink bandwidth is configured by a plurality of Resource Blocks ('RBs) and each Physical Resource Block (PRB) may be configured by 12 sub-carriers arranged along the frequency axis and 14 or 12 OFDM symbols arranged along the time axis. The PRB serves as a basic unit for resource allocation.

A Reference Signal (RS) is a signal originated from a base station. A mobile station performs channel estimation by using the RS. In an LTE communication system, the RS includes a Common Reference Signal (CRS) and a DeModulation Reference Signal (DMRS). The DMRS is a kind of dedicated reference signal.

The CRS is a reference signal transmitted over the entire downlink bandwidth. All mobile stations can receive the CRS. The CRS is used for channel estimation, configuration of feedback information of a mobile station, or demodulation of a control channel or a data channel. The DMRS is also a reference signal transmitted over the entire downlink bands. The DMRS is used for channel estimation and demodulation of a data channel of a particular mobile station and is not used for configuration of feedback information differently from the CRS. Therefore, the DMRS is transmitted through a PRB to be scheduled by a mobile station.

On the time axis, a sub-frame is configured by two slots having a length of 0.5 msec, which include a first slot and a second slot. A Physical Downlink Control Channel (PDCCH) area, which is a control channel area, and an enhanced PDCCH (ePDCCH) area, which is a data channel area, are divided on the time axis and are then transmitted. This is in order to rapidly receive and demodulate the control channel signal. Moreover, the PDCCH area is located over the entire downlink bandwidth, wherein one control channel is divided into control channels of a smaller unit, which are distributed over the entire downlink bandwidth.

In large, uplink channels are divided into a control channel (Physical Uplink Control CHannel; PUCCH) and a data channel (Physical Uplink Shared CHannel; PUSCH). When an uplink data channel is not scheduled, a response channel with respect to a downlink data channel and other feedback information are transferred through the control channel. When an uplink data channel has been scheduled, a response channel with respect to a downlink data channel and other feedback information are transferred through the data channel.

Figure 1B:
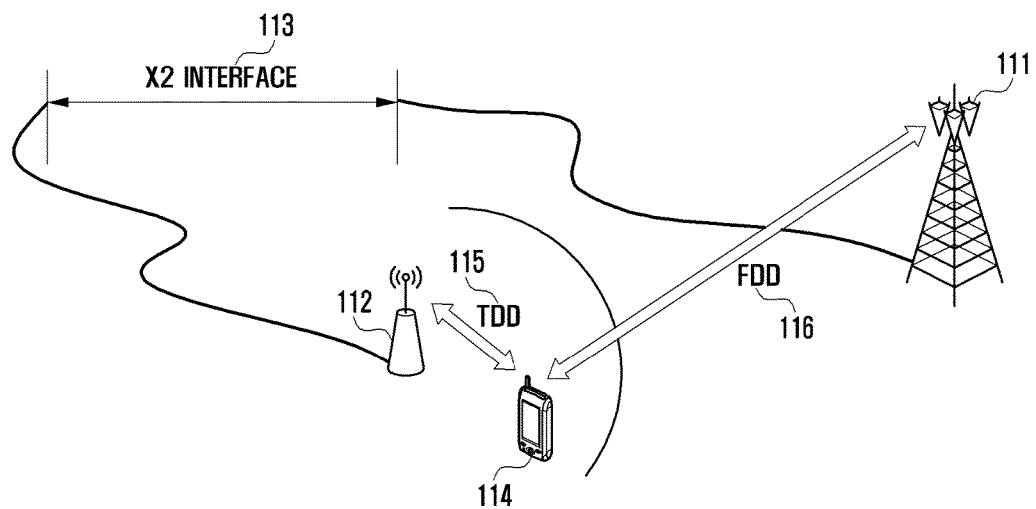

FIGS. 1A and 1B illustrate communication systems to which some embodiments of the present disclosure are applied. Referring to FIG. 1A, a TDD cell 102 and an FDD cell 103 coexist in one base station 101 in the network. A mobile station 104 transmits data to the base station and receives data from the base station through the TDD cell 102 and the FDD cell 103. However, the mobile station 104 performs uplink transmission through only a Primary cell (Pcell). That is, when the TDD cell 102 is a Pcell, the mobile station 104 performs uplink transmission through only the TDD cell 102. When the FDD cell 103 is the Pcell, the mobile station 104 performs uplink transmission through only the FDD cell 103.

Referring to FIG. 1B, a macro base station 111 for wide coverage and a pico base station 112 for increasing the data transmission coexist in the network. In the system shown in FIG. 1B, the macro base station 111 performs a communication with a mobile station 114 by using an FDD scheme 116 and the pico base station 112 performs a communication with the mobile station 114 by using a TDD scheme 115. However, when the macro base station is a Pcell, the mobile station performs uplink transmission through the macro base station 111. In this event, it is assumed that the macro base station 111 and the pico base station 112 have an ideal backhaul network. Therefore, an X2 communication 113 between base stations with a high speed can be achieved. As a result, even when an uplink signal is transmitted from the mobile station 114 to the macro base station 111, the pico base station 112 can receive control information relating to the mobile station 114 from the macro base station 111 in real time through the X2 communication 113.

Although the schemes proposed in embodiments of the present disclosure can be applied to both the system shown in FIG. 1A and the system shown in FIG. 1B, the following description is mainly based on the system shown in FIG. 1A.

Figure 1C:
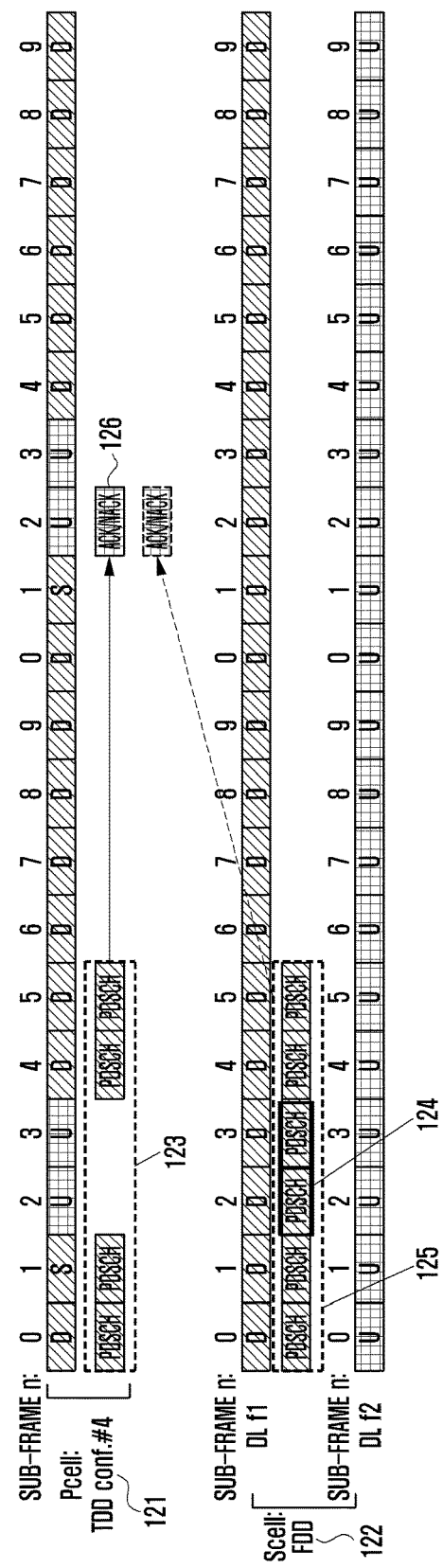
FIG. 1C illustrates a diagram for describing control channel transmission.

FIG. 1C illustrates a diagram for describing control channel transmission.

Referring to FIG. 1C, cells 121 and 122 using different duplex schemes coexist. In FIG. 1C, the Primary cell (Pcell) 121 uses a TDD scheme and includes downlink sub-frames and uplink sub-frames configured according to TDD UL-DL configuration #4. The secondary cell (Scell) 122 employs an FDD scheme. A frequency f1 is used for the downlink transmission and a frequency f2 is used for the uplink transmission. When Physical Downlink Shared Channels (PDSCHs) 123 are scheduled in the TDD cell 121, Hybrid Automatic Repeat reQuest-ACKnowledgements (HARQ-ACKs) 126 for the PDSCHs 123 are transmitted in uplink sub-frame #2 of the TDD cell according to the HARQ timing defined in TDD UL-DL configuration #4.

In an embodiment, when the PDSCHs 125 are scheduled in the FDD cell 122, HARQ-ACKs for PDSCHs corresponding to downlink sub-frames (sub-frames 0, 1, 4, and 5) of the FDD cell 122 at the same positions as those of the downlink sub-frames of the TDD cell 121 among the PDSCHs 125 may be transmitted in uplink sub-frame #2 of the TDD cell 121 according to the HARQ timing defined in the UL-DL configuration of the TDD cell 121.

In an embodiment, it is also necessary to define timing for transmission of HARQ-ACKs for PDSCHs 124, which are scheduled in the downlink sub-frames (sub-frames #2 and #3) of the FDD cell 122 at the same positions as those of the uplink sub-frames of the TDD cell 121. However, since the sub-frames of the TDD cell 121 at the corresponding timing are uplink sub-frames, the TDD UL-DL configuration does not include a definition for the timing. Therefore, it is required to define new HARQ timing.

Further, if format 1b with channel selection is configured as a transmission format for transmission of an HARQ-ACK in a mobile station, another problem may occur. The format 1b with channel selection is designed to allow a maximum of four HARQ-ACKs for downlink sub-frames to be transmitted in each cell. Therefore, a new transmission method is necessary for an embodiment in which the number of HARQ-ACKs of the PDSCHs 123 of the TDD cell 121 and the PDSCHs 125 of the FDD cell 122, which should be transmitted by a mobile station in one cell, i.e. the number of downlink sub-frames configured to correspond to one cell in an HARQ-ACK transmission relation, exceeds four.

For PDSCHs scheduled in downlink sub-frames of an FDD cell at the same positions of those of uplink sub-frames of a TDD cell, the present disclosure proposes an HARQ timing method as follows.

According to the an embodiment of the present disclosure (see FIGS. 2A to 2G), HARQ-ACKs are transmitted at HARQ timing defined to match up with a nearest downlink sub-frame among downlink sub-frames of a TDD cell before downlink sub-frames in which PDSCHs are scheduled. In the embodiment of obeying the HARQ timing, a mobile station may be unable to secure a processing time of four sub-frames for the received PDSCHs. In this event, as an exception, HARQ-ACKs corresponding to PDSCHs scheduled in downlink sub-frames of an FDD cell are transmitted at HARQ timing defined to match up with a nearest downlink sub-frame of a TDD cell existing after the downlink sub-frames of the FDD cell. According to an embodiment, it is possible to transmit an HARQ-ACK (feedback) as fast as possible, so as to increase the data rate.

According to an embodiment of the present disclosure (see FIGS. 3A to 3G), HARQ-ACKs are transmitted at HARQ timing defined to match up with a downlink sub-frame of a TDD cell nearest to a downlink sub-frame of an FDD cell in which PDSCHs are scheduled, among downlink sub-frames of the TDD cell before and after the downlink sub-frame of the FDD cell in which the PDSCHs are scheduled. When there are two or more downlink sub-frames nearest to the downlink sub-frame of the FDD cell in which the PDSCHs are scheduled, HARQ-ACKs are transmitted at HARQ timing defined to match up with a downlink sub-frame having a smallest sub-frame index. In the embodiment of obeying the HARQ timing, a mobile station may be unable to secure a processing time of four sub-frames for the received PDSCHs. In this event, as an exception, HARQ-ACKs corresponding to PDSCHs scheduled in a downlink sub-frame of the FDD cell are transmitted at HARQ timing defined to match up with a downlink sub-frame of the TDD cell, which is nearest to the downlink sub-frame of the FDD cell and exists after the downlink sub-frame of the FDD cell. According to an embodiment, HARQ-ACK feedbacks for PDSCHs scheduled in downlink sub-frames of the FDD cell are distributed over all uplink sub-frames for uniform transmission, so as to prevent too many HARQ-ACK feedbacks from being transmitted in a particular uplink sub-frame.

According to an embodiment of the present disclosure (see FIGS. 4A to 4G), HARQ-ACKs are transmitted at HARQ timing defined to match up with a downlink sub-frame of a TDD cell nearest to a downlink sub-frame of an FDD cell in which PDSCHs are scheduled, among downlink sub-frames of the TDD cell after the downlink sub-frame of the FDD cell in which the PDSCHs are scheduled. According to an embodiment, it is possible to always secure a processing time of four sub-frames without determination of an additional condition.

According to an embodiment, scheduling of PDSCHs in downlink sub-frames of an FDD cell at the same positions as those of uplink sub-frames of a TDD cell is prohibited. That is, scheduling of PDSCHs is allowed in only a downlink sub-frame of an FDD cell having the same index as that of a downlink sub-frame of a TDD cell. According to an embodiment, it is possible to simply define the operations of a mobile station and a base station. However, since scheduling of PDSCHs is prohibited in downlink sub-frames of the FDD cell, the quantity of transmitted data is reduced.

FIGS. 2A to 2G illustrate control channel transmission according to an embodiment of the present disclosure. Hereinafter, FIGS. 2A to 2G are collectively referred to as FIG. 2.

FIG. 2 illustrates control channel transmission according to an embodiment of the present disclosure. The present embodiment is now described based on seven example situations shown FIGS. 2A to 2G. The following description discusses how to apply the HARQ timing when a TDD cell is configured by uplink sub-frames and an uplink control channel for data in a downlink sub-frame of an FDD cell is transmitted in the TDD cell. In FIGS. 2A to 2G, the Pcell can always be configured to employ the TDD scheme and the Scell can always be configured to employ the FDD scheme. FIG. 2A shows an example in the embodiment of TDD UL-DL configuration #0, FIG. 2B shows an example in the embodiment of TDD UL-DL configuration #1, FIG. 2C shows an example in the embodiment of TDD UL-DL configuration #2, FIG. 2D shows an example in the embodiment of TDD UL-DL configuration #3, FIG. 2E shows an example in the embodiment of TDD UL-DL configuration #4, FIG. 2F shows an example in the embodiment of TDD UL-DL configuration #5, and FIG. 2G shows an example in the embodiment of TDD UL-DL configuration #6.

Figure 2A:
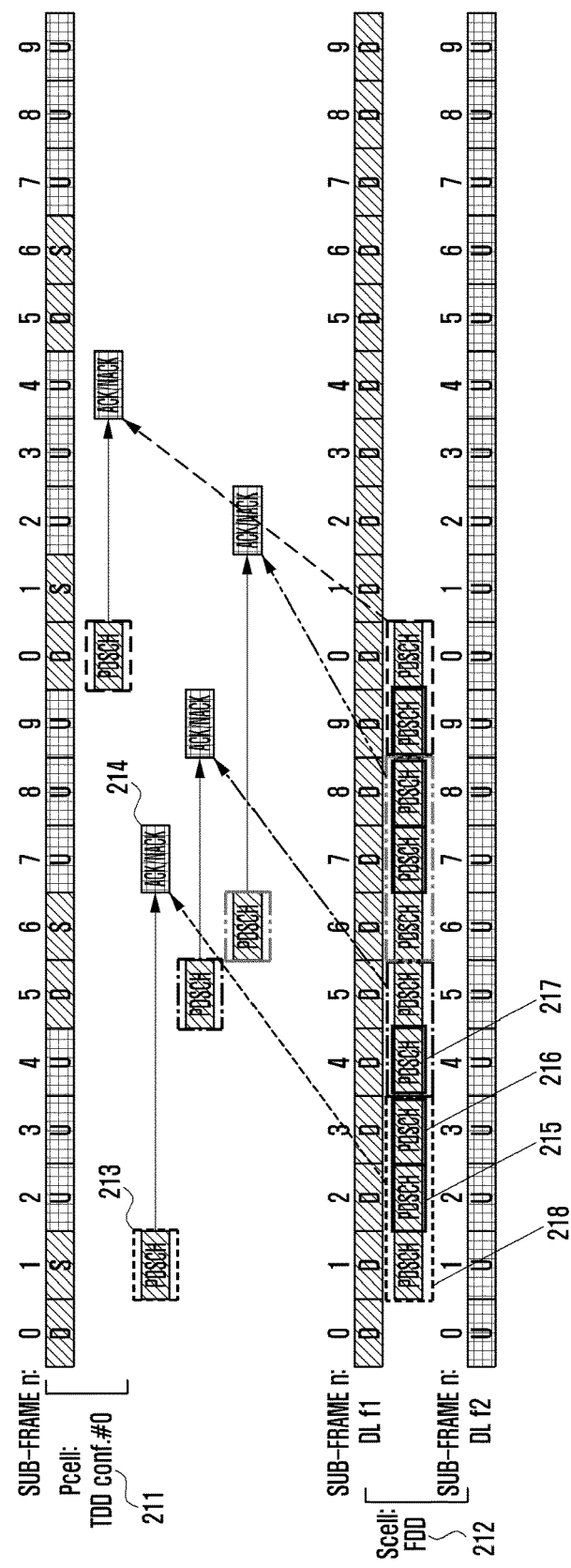

In FIG. 2A, the Pcell 211 is configured to employ the TDD scheme and includes downlink sub-frames and uplink sub-frames configured according to TDD UL-DL configuration #0. The Scell 212 is configured to employ the FDD scheme, a frequency f1 is used for the downlink transmission, and a frequency f2 is used for the uplink transmission.

PDSCHs 215 and 216 are scheduled in downlink sub-frames #2 and #3 in the FDD cell 212. The TDD cell 211 is configured by uplink sub-frames at the time points of downlink sub-frames #2 and #3 of the FDD cell 212. HARQ-ACKs for the PDSCHs 215 and 216 are transmitted in uplink sub-frame #7 of the TDD cell 211 according to an embodiment. That is, a downlink sub-frame of the TDD cell nearest to downlink sub-frames #2 and #3 in which the PDSCHs 215 and 216 are scheduled, among the sub-frames of the TDD cell before downlink sub-frames #2 and #3, is downlink sub-frame #1 of the TDD cell. According to the HARQ timing defined to match up with downlink sub-frame #1 of the TDD cell, HARQ-ACKs for the PDSCHs 215 and 216 are transmitted in uplink sub-frame #7 of the TDD cell 211.

However, when the PDSCH 217 is scheduled in downlink sub-frame #4 of the FDD cell 212, the TDD cell 211 is configured by an uplink sub-frame at that time point. In this event, when an HARQ-ACK for the PDSCH 217 is transmitted in uplink sub-frame #7, a processing time of four sub-frames is not secured. Therefore, the HARQ-ACK for the PDSCH 217 is transmitted in uplink sub-frame #9 of the TDD cell 211 according to HARQ timing defined to match up with downlink sub-frame #5 firstly located after downlink sub-frame #1 of the TDD cell 211, which is the nearest downlink sub-frame among the downlink sub-frames before downlink sub-frame #4 in which the PDSCH 217 is scheduled. That is, a downlink sub-frame nearest to downlink sub-frame #4 among the sub-frames of the TDD cell before downlink sub-frames #4 of the PDSCH 217 is downlink sub-frame #1 of the TDD cell. In the embodiment of using uplink sub-frame #7, which is an HARQ-ACK transmission sub-frame corresponding to downlink sub-frame #1, it may not be possible to secure a processing time of four sub-frames. Therefore, it is necessary to find a first downlink sub-frame after downlink sub-frame #1, which is downlink sub-frame #5. An HARQ-ACK transmission sub-frame corresponding to sub-frame #5 is uplink sub-frame #9, and an HARQ-ACK for the PDSCH 217 is transmitted in uplink sub-frame #9 of the TDD cell 211.

In an embodiment, when the PDSCH 213 in the TDD cell 211 is scheduled in sub-frame #1, HARQ-ACKs for the PDSCHs 218 of the FDD cell 212 are multiplexed with the HARQ-ACK for the PDSCH 213 and are then transmitted in uplink sub-frame #7 (operation 214).

Figure 2B:
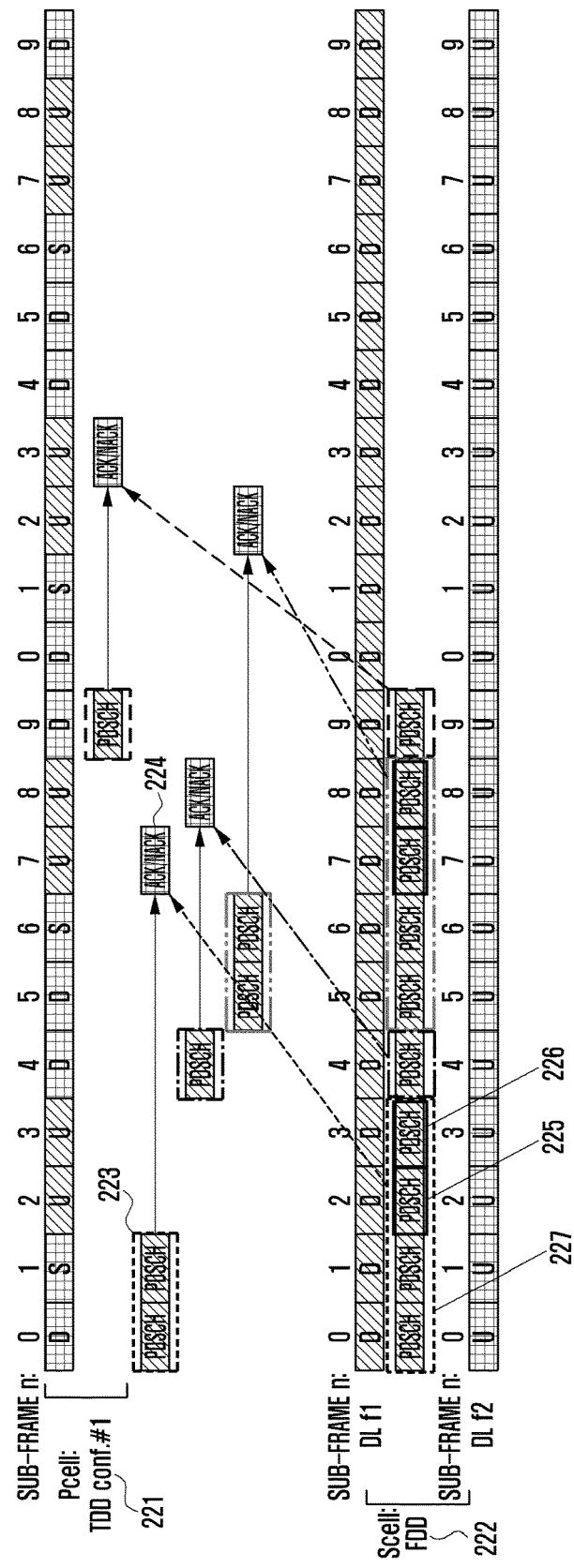

In FIG. 2B, the Pcell 221 is configured to employ the TDD scheme and includes downlink sub-frames and uplink sub-frames configured according to TDD UL-DL configuration #1. The Scell 222 is configured to employ the FDD scheme, frequency f1 is used for the downlink transmission, and frequency f2 is used for the uplink transmission.

PDSCHs 225 and 226 are scheduled in downlink sub-frames #2 and #3 in the FDD cell 222. At these time points, the TDD cell 221 is configured by uplink sub-frames. HARQ-ACKs for the PDSCHs 225 and 226 are transmitted in uplink sub-frame #7 of the TDD cell 221 according to an embodiment. That is, HARQ-ACKs are transmitted according to the HARQ timing defined to match up with downlink sub-frame #1 of the TDD cell 221, which is a nearest downlink sub-frame among the downlink sub-frames before downlink sub-frames #2 and #3 in which the PDSCHs 225 and 226 are scheduled. Since the HARQ timing defined to match up with downlink sub-frame #1 of the TDD cell corresponds to uplink sub-frame #7 of the TDD cell 221, HARQ-ACKs for the PDSCHs 225 and 226 are transmitted in uplink sub-frame #7 of the TDD cell 221.

In an embodiment, when the PDSCHs 223 in the TDD cell 221 are scheduled in sub-frames #0 and #1, HARQ-ACKs for the PDSCHs 227 of the FDD cell are multiplexed with the HARQ-ACKs for the PDSCHs 223 and are then transmitted in uplink sub-frame #7 of the TDD cell (operation 224).

Figure 2C:
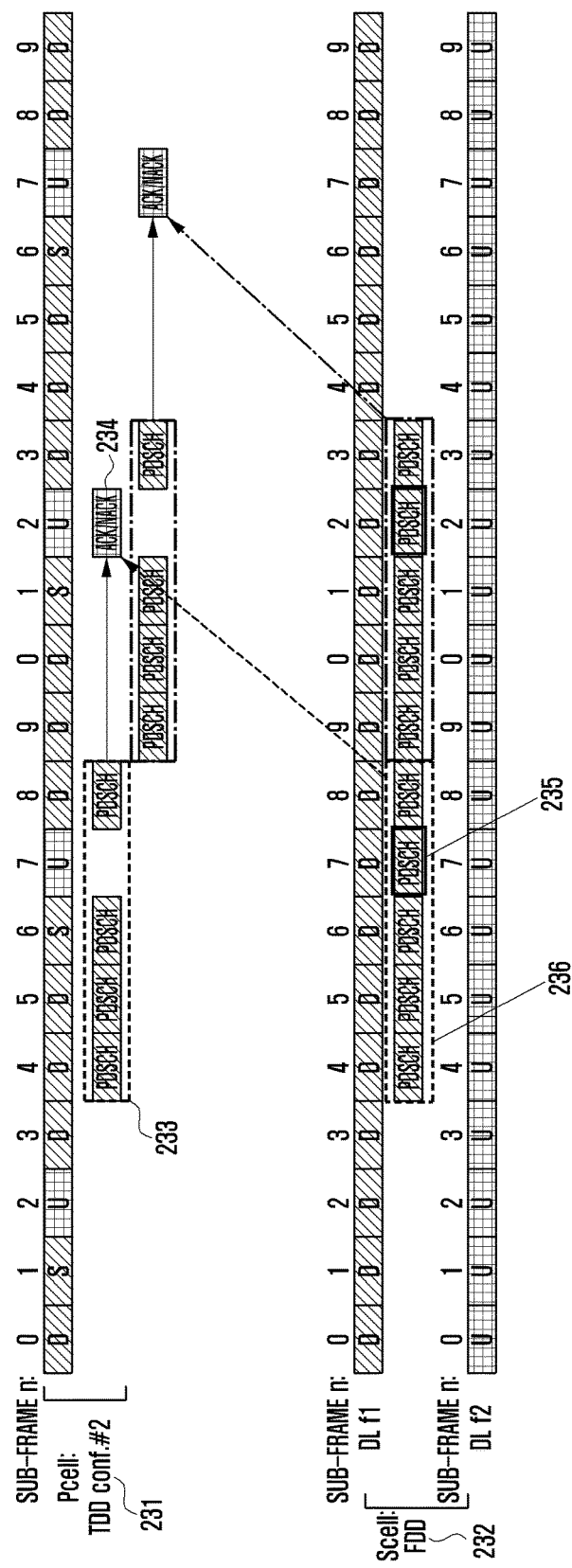

In FIG. 2C, the Pcell 231 is configured to employ the TDD scheme and includes downlink sub-frames and uplink sub-frames configured according to TDD UL-DL configuration #2. The Scell 232 is configured to employ the FDD scheme, frequency f1 is used for the downlink transmission, and frequency f2 is used for the uplink transmission.

A PDSCH 235 is scheduled in downlink sub-frame #7 in the FDD cell 232. Downlink sub-frame #7 of the FDD cell 232 corresponds to a time point at which the TDD cell 231 is configured by an uplink sub-frame. An HARQ-ACK for the PDSCH 235 is transmitted in uplink sub-frame #2 of the TDD cell 231 according to an embodiment. That is, the HARQ-ACK for the PDSCH 235 is transmitted in uplink sub-frame #2 of the TDD cell 231 according to HARQ timing defined to match up with downlink sub-frame #6 of the TDD cell 231, which is a downlink sub-frame nearest to downlink sub-frame #7 among the downlink sub-frames of the TDD cell 231 before downlink sub-frame #7 in which the PDSCH 235 is scheduled.

In an embodiment, when the PDSCHs 223 in the TDD cell 231 are scheduled in sub-frames #4, #5, #6, and #8, HARQ-ACKs for the PDSCHs 236 of the FDD cell are multiplexed with the HARQ-ACKs for the PDSCHs 233 and are then transmitted in uplink sub-frame #2 of the TDD cell 231 (operation 234).

Figure 2D:
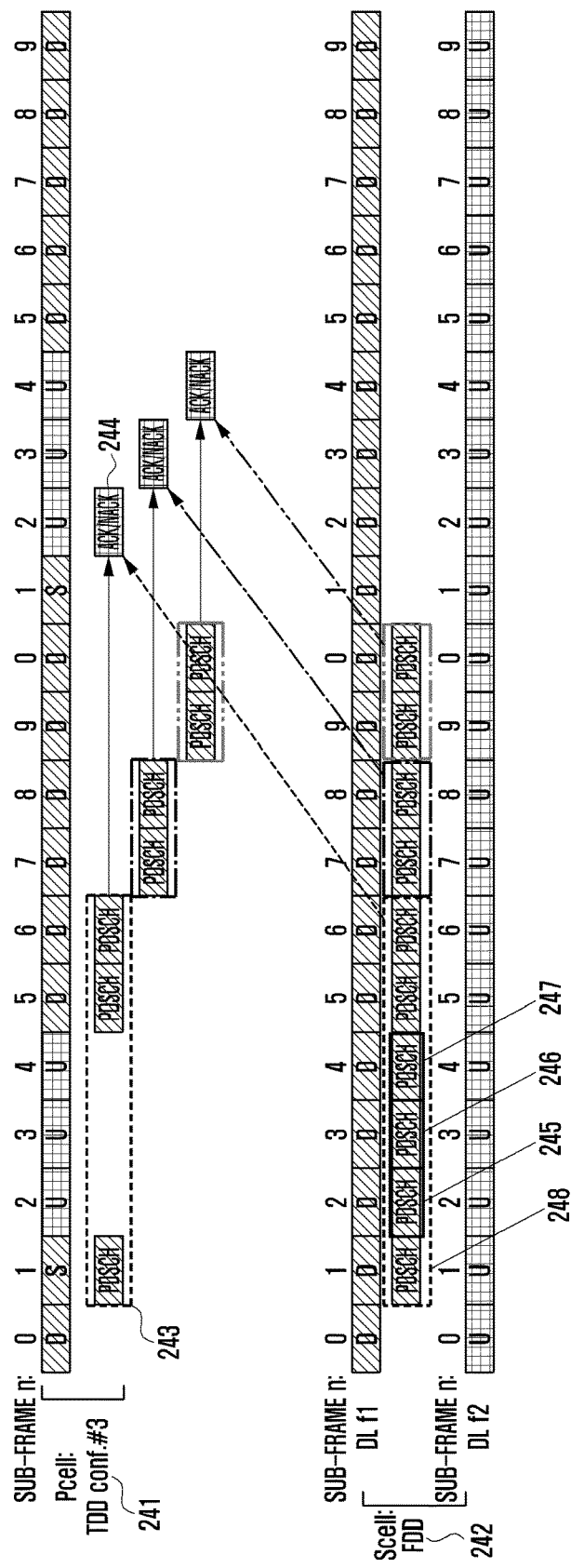

Referring to FIG. 2D, the Pcell 241 is configured to employ the TDD scheme and includes downlink sub-frames and uplink sub-frames configured according to TDD UL-DL configuration #3. The Scell 242 is configured to employ the FDD scheme, frequency f1 is used for the downlink transmission, and frequency f2 is used for the uplink transmission.

When PDSCHs 245, 246, and 247 are scheduled in downlink sub-frames #2, #3, and #4 of the FDD cell 242, HARQ-ACKs for the PDSCHs 245, 246, and 247 are transmitted in uplink sub-frame #2 of the TDD cell 241 according to an embodiment. That is, the HARQ-ACKs for the PDSCHs 245, 246, and 247 are transmitted in uplink sub-frame #2 of the TDD cell 241 according to HARQ timing defined to match up with downlink sub-frame #1 of the TDD cell, which is a downlink sub-frame nearest to downlink sub-frames #2, #3, and #4 among the downlink sub-frames before downlink sub-frames #2, #3, and #4 in which the PDSCHs 245, 246, and 247 are scheduled.

In an embodiment, when the PDSCHs 243 in the TDD cell 241 are scheduled in sub-frame #1, #5, and #6, HARQ-ACKs for the PDSCHs 248 of the FDD cell are multiplexed with the HARQ-ACKs for the PDSCHs 243 and are then transmitted in uplink sub-frame #2 of the TDD cell 241 (operation 244).

Referring to FIG. 2E, the Pcell 251 is configured to employ the TDD scheme and includes downlink sub-frames and uplink sub-frames configured according to TDD UL-DL configuration #4. The Scell 252 is configured to employ the FDD scheme, frequency f1 is used for the downlink transmission, and frequency f2 is used for the uplink transmission.

PDSCHs 255 and 256 are scheduled in downlink sub-frames #2 and #3 in the FDD cell 252. Uplink sub-frames are configured in the TDD cell 251 at the time points of downlink sub-frames #2 and #3 of the FDD cell 251. HARQ-ACKs for the PDSCHs 255 and 256 are transmitted in uplink sub-frame #2 of the TDD cell 251 according to an embodiment. That is, the HARQ-ACKs for the PDSCHs 255 and 256 are transmitted in uplink sub-frame #2 of the TDD cell 251 according to HARQ timing defined to match up with downlink sub-frame #1 of the TDD cell, which is a downlink sub-frame nearest to downlink sub-frames #2 and #3 among the downlink sub-frames before downlink sub-frames #2 and #3 in which the PDSCHs 255 and 256 are scheduled.

In an embodiment, when the PDSCHs 253 in the TDD cell 251 are scheduled in sub-frames #0, #1, #4, and #5, HARQ-ACKs for the PDSCHs 257 of the FDD cell are multiplexed with the HARQ-ACKs for the PDSCHs 253 and are then transmitted in uplink sub-frame #2 of the TDD cell 251 (operation 254).

Figure 2F:
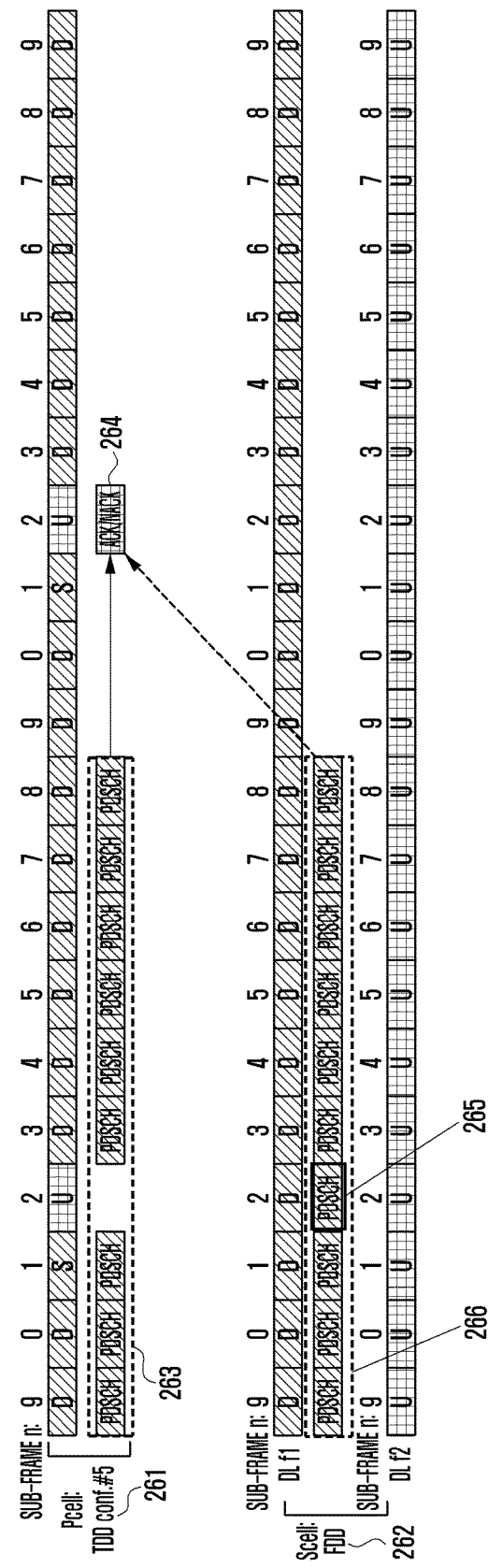

Referring to FIG. 2F, the Pcell 261 is configured to employ the TDD scheme and includes downlink sub-frames and uplink sub-frames configured according to TDD UL-DL configuration #5. The Scell 262 is configured to employ the FDD scheme, frequency f1 is used for the downlink transmission, and frequency f2 is used for the uplink transmission.

A PDSCH 265 is scheduled in downlink sub-frame #2 in the FDD cell 262. The TDD cell 262 is configured by an uplink sub-frame at the time point of downlink sub-frame #2 in the FDD cell 262. An HARQ-ACK for the PDSCH 265 is transmitted in uplink sub-frame #1 of the TDD cell 261 according to an embodiment. That is, the HARQ-ACK for the PDSCH 265 is transmitted in uplink sub-frame #2 of the TDD cell 261 according to HARQ timing defined to match up with downlink sub-frame #1 of the TDD cell, which is the nearest downlink sub-frame among the downlink sub-frames before downlink sub-frame #2 in which the PDSCH 265 is scheduled.

In an embodiment, when the PDSCHs 263 in the TDD cell 261 are scheduled in sub-frames #9, #0, #1, #3, #4, #5, #6, #7, and #8, HARQ-ACKs for the PDSCHs 266 of the FDD cell 262 are multiplexed with the HARQ-ACKs for the PDSCHs 263 and are then transmitted in uplink sub-frame #2 of the TDD cell 261 (operation 264).

Figure 2G:
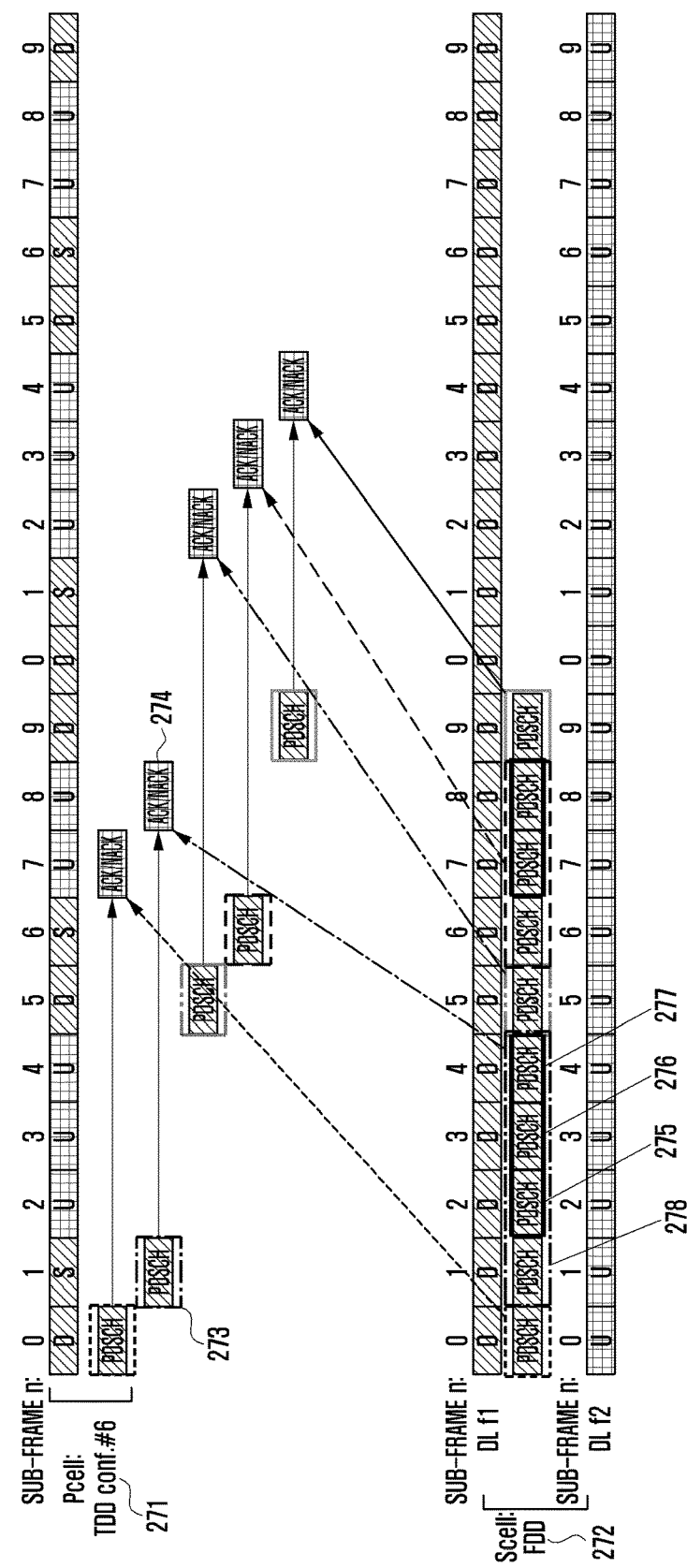

Referring to FIG. 2G, the Pcell 271 is configured to employ the TDD scheme and includes downlink sub-frames and uplink sub-frames configured according to TDD UL-DL configuration #6. The Scell 272 is configured to employ the FDD scheme, frequency f1 is used for the downlink transmission, and frequency f2 is used for the uplink transmission.

When PDSCHs 275, 276, and 277 are scheduled in downlink sub-frames #2, #3, and #4 of the FDD cell 272, HARQ-ACKs for the PDSCHs 275, 276, and 277 are transmitted in uplink sub-frame #8 of the TDD cell 271 according to an embodiment. That is, the HARQ-ACKs for the PDSCHs 275, 276, and 277 are transmitted in uplink sub-frame #8 of the TDD cell 271 according to HARQ timing defined to match up with downlink sub-frame #1 of the TDD cell 271, which is a downlink sub-frame nearest to downlink sub-frames #2, #3, and #4 among the downlink sub-frames before downlink sub-frames #2, #3, and #4 in which the PDSCHs 275, 276, and 277 are scheduled.

In an embodiment, when the PDSCH 273 in the TDD cell 271 is scheduled in sub-frame #1, HARQ-ACKs for the PDSCHs 278 of the FDD cell 272 are multiplexed with the HARQ-ACK for the PDSCH 273 and are then transmitted in uplink sub-frame #8 of the TDD cell 271 (operation 274).

Table 1 shows sub-frames (n–k) of an FDD cell receiving PDSCHs, HARQ-ACKs of which should be transmitted in uplink sub-frame n of a TDD cell according to an embodiment based on TDD UL-DL configurations in FIGS. 2A to 2G.

TABLE 1

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5, 4 | 4 | — | — | — | 7, 6, 5, 4 | 4 | — |
| 2 | — | — | 8, 7, 5, 4, 6 | — | — | — | — | 8, 7, 5, 4, 6 | — | — |
| 3 | — | — | 10, 9, 8, 7, 6, 11 | 6, 5 | 5, 4 | — | — | — | — | — |
| 4 | — | — | 12, 10, 9, 8, 7, 11 | 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 7 | 7, 6, 5 | 5 | — | — | 7 | 7, 6, 5, 4 | — |

For example, when the Pcell is configured according to UL-DL configuration #4, HARQ-ACKs received through uplink sub-frame #2 are HARQ-ACKs for PDSCHs of downlink sub-frames located by 12, 10, 9, 8, 7, and 11 sub-frames prior to uplink sub-frame #2, respectively.

The sequence of the sub-frames (n–k) of Table 1 may be changed according to the transmission sequence of the HARQ-ACK bits. For example, although the downlink sub-frames, HARQ-ACKs of which are transmitted in uplink sub-frame #2 of TDD UL-DL configuration #2, are in the sequence of downlink sub-frames #4 (=12−8), #5 (=12−7), #7 (=12−5), #8 (=12−4), and #6 (=12−6) according to Table 1, they may be in a sequence of sub-frames #4, #5, #6, #7, and #8 according to the sequence for transmission of HARQ-ACKs.

Figure 3A:
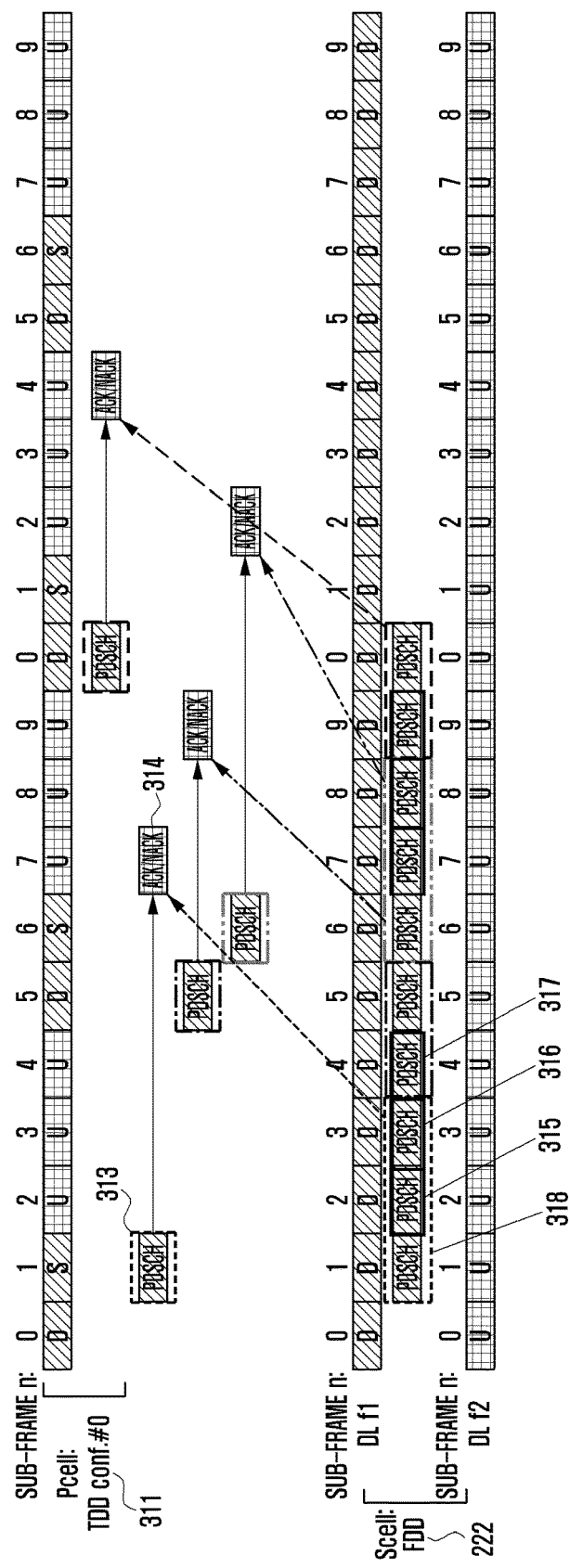
FIGS. 3A to 3G illustrate control channel transmission according to an embodiment of the present disclosure.
Figure 3B:
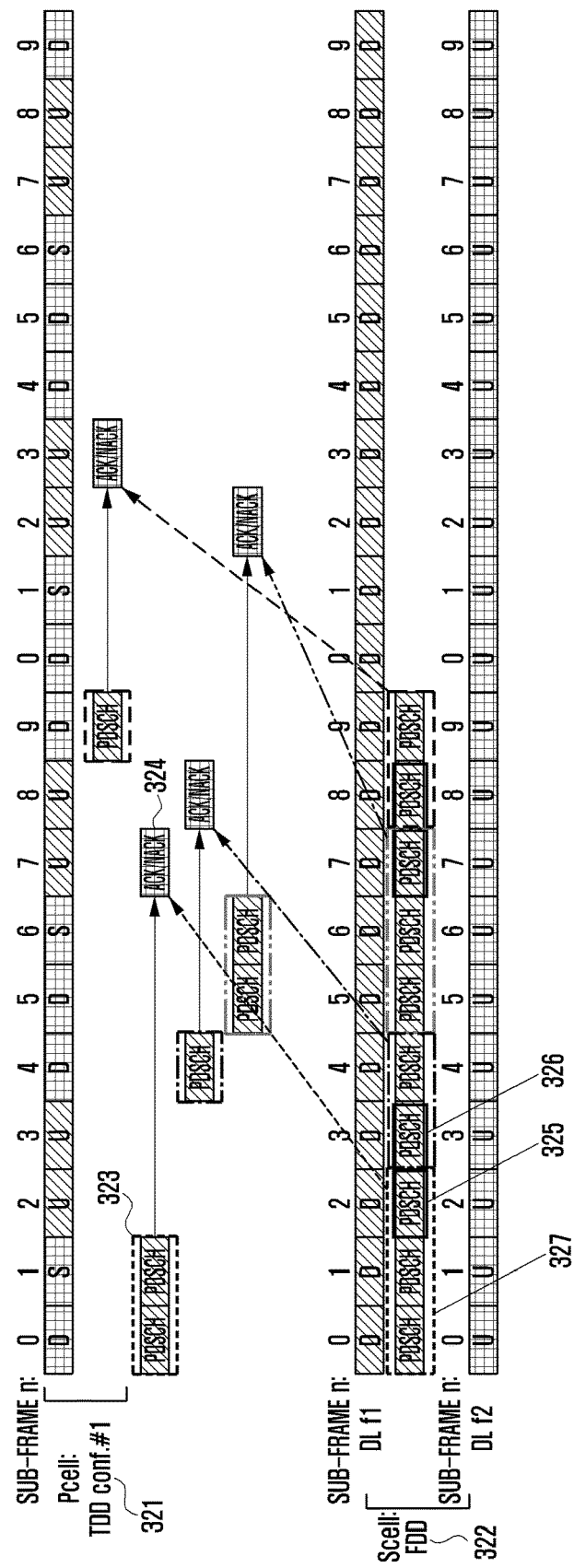
Figure 3C:
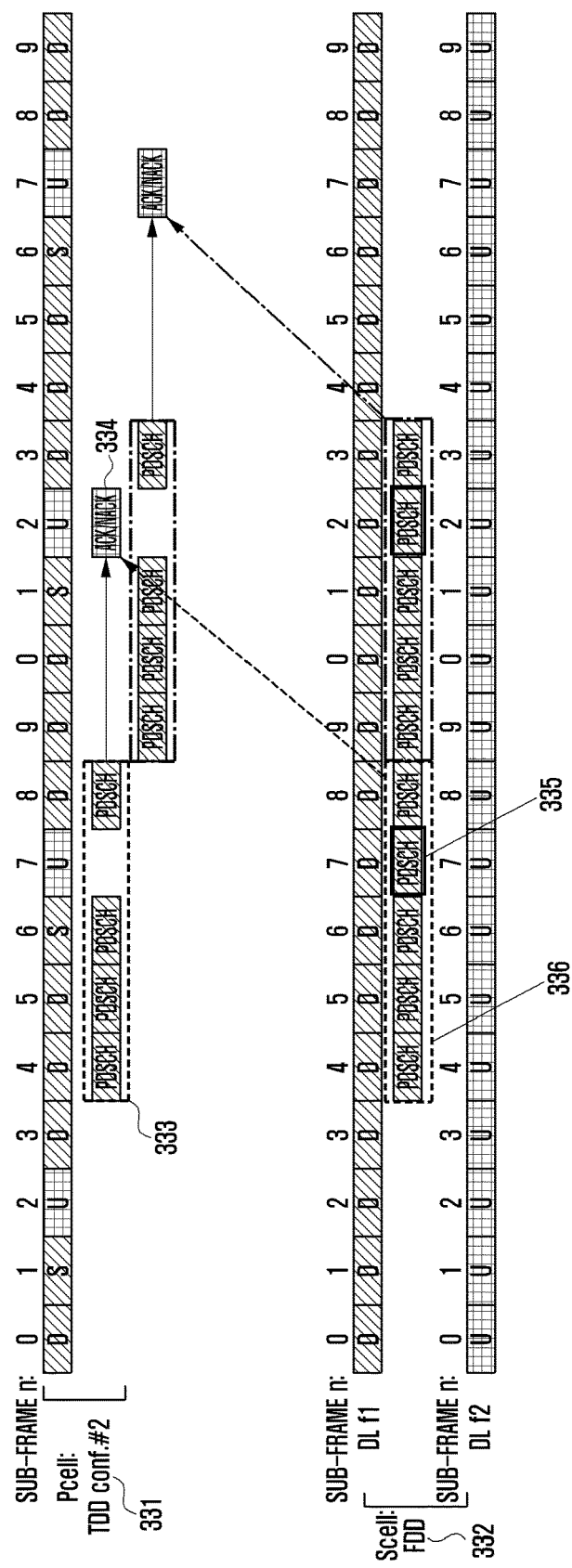
Figure 3D:
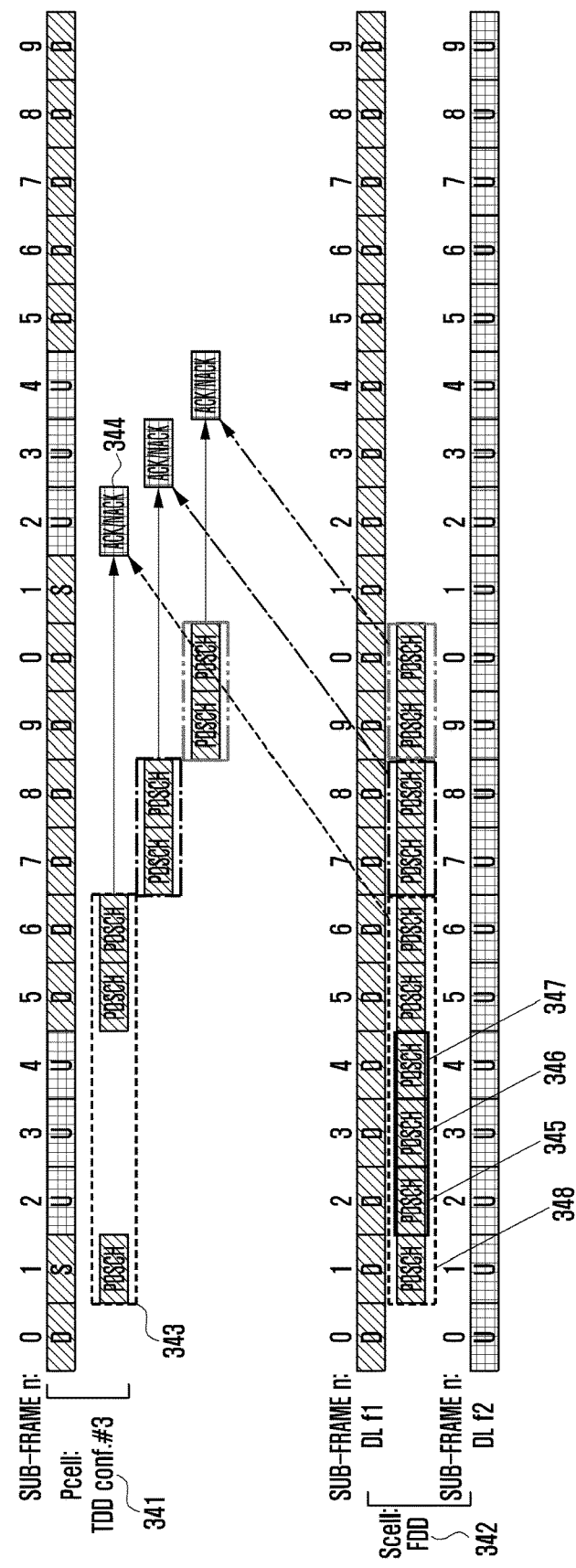
Figure 3E:
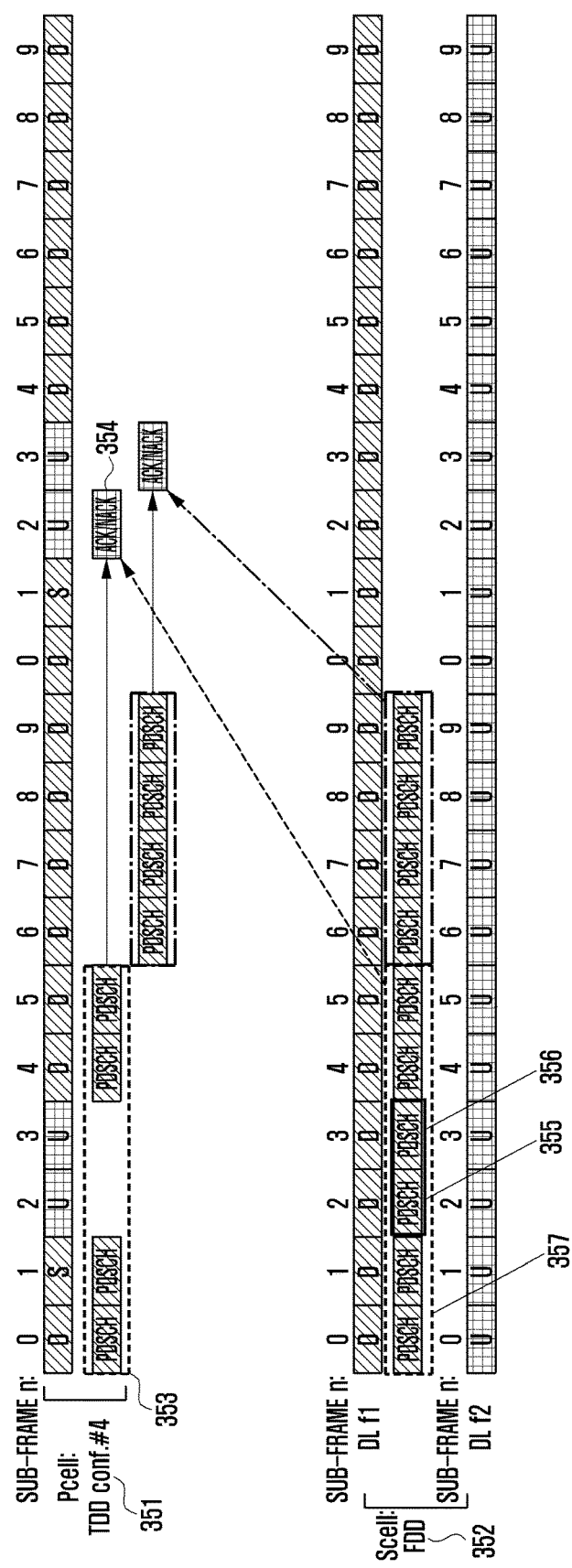
Figure 3F:
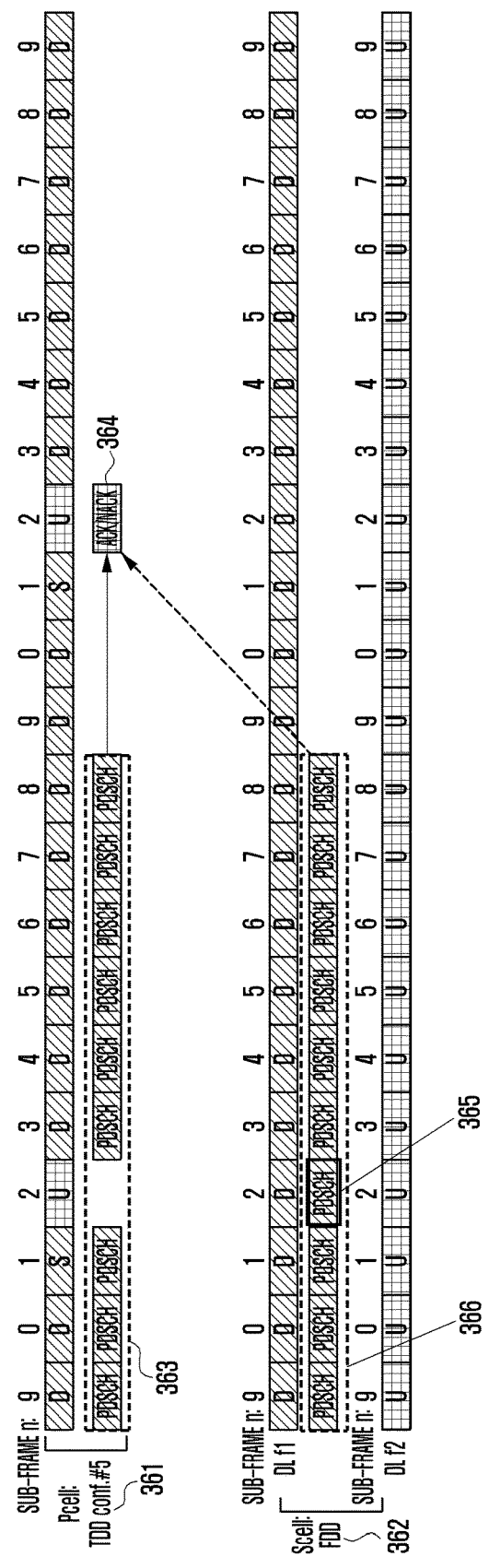
Figure 3G:
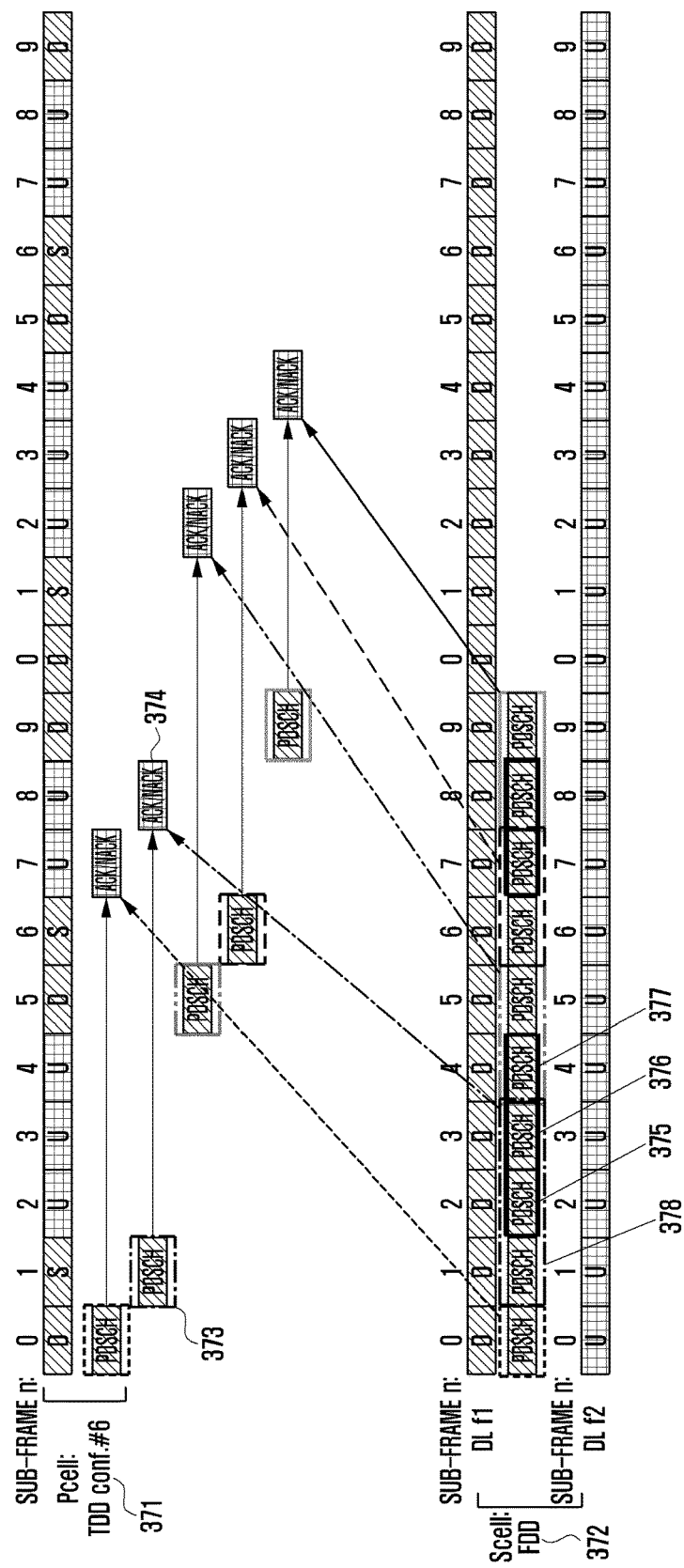

FIGS. 3A to 3G illustrate control channel transmission according to an embodiment of the present disclosure. The present embodiment is now described based on seven example situations shown FIGS. 3A to 3G. Hereinafter, a method of configuring HARQ timing when an uplink control channel for data in a downlink sub-frame of an FDD cell is transmitted at a time point at which a TDD cell is configured by an uplink sub-frame will be described. In FIGS. 3A to 3G, the Pcell can always be configured to employ the TDD scheme and the Scell can always be configured to employ the FDD scheme. FIG. 3A shows an example in the embodiment of TDD UL-DL configuration #0, FIG. 3B shows an example in the embodiment of TDD UL-DL configuration #1, FIG. 3C shows an example in the embodiment of TDD UL-DL configuration #2, FIG. 3D shows an example in the embodiment of TDD UL-DL configuration #3, FIG. 3E shows an example in the embodiment of TDD UL-DL configuration #4, FIG. 3F shows an example in the embodiment of TDD UL-DL configuration #5, and FIG. 3G shows an example in the embodiment of TDD UL-DL configuration #6. Hereinafter, FIGS. 3A to 3G are collectively referred to as FIG. 3.

Referring to FIG. 3A, the Pcell 311 is configured to employ the TDD scheme and includes downlink sub-frames and uplink sub-frames configured according to TDD UL-DL configuration #0. The Scell 312 is configured to employ the FDD scheme, frequency f1 is used for the downlink transmission, and frequency f2 is used for the uplink transmission.

PDSCHs 315 and 316 are scheduled in downlink sub-frames #2 and #3 in the FDD cell 312. The TDD cell 312 is configured by uplink sub-frames at the time points of downlink sub-frames #2 and #3 of the FDD cell 311. HARQ-ACKs for the PDSCHs 315 and 316 are transmitted in uplink sub-frame #7 of the TDD cell 311 according to an embodiment. That is, the HARQ-ACK for the PDSCH 315 is transmitted in uplink sub-frame #7 of the TDD cell 311 according to HARQ timing defined to match up with downlink sub-frame #1 of the TDD cell 311, which is the nearest downlink sub-frame of the TDD cell 311 among the downlink sub-frames before or after downlink sub-frame #2 in which the PDSCH 315 is scheduled. Further, the HARQ-ACK for the PDSCH 316 is transmitted in uplink sub-frame #7 of the TDD cell 311 according to HARQ timing defined to match up with downlink sub-frame #1 of the TDD cell 311, which is a downlink sub-frame having a smallest index between downlink sub-frames #1 and #5 corresponding to the nearest downlink sub-frames of the TDD cell 311 among the downlink sub-frames before or after downlink sub-frame #3 in which the PDSCH 316 is scheduled. Further, the HARQ-ACK for the PDSCH 317 is transmitted in uplink sub-frame #9 of the TDD cell 311 according to HARQ timing defined to match up with downlink sub-frame #5 of the TDD cell 311, which is the nearest downlink sub-frame of the TDD cell 311 among the downlink sub-frames before or after downlink sub-frame #4 in which the PDSCH 317 is scheduled.

In an embodiment, when the PDSCH 313 in the TDD cell 311 is scheduled in sub-frame #1, HARQ-ACKs for the PDSCHs 318 of the FDD cell are multiplexed with the HARQ-ACK for the PDSCH 313 and are then transmitted in uplink sub-frame #7 of the TDD cell 311 (operation 314).

Referring to FIG. 3B, the Pcell 321 is configured to employ the TDD scheme and includes downlink sub-frames and uplink sub-frames configured according to TDD UL-DL configuration #1. The Scell 322 is configured to employ the FDD scheme, frequency f1 is used for the downlink transmission, and frequency f2 is used for the uplink transmission.

PDSCHs 325 and 326 are scheduled in downlink sub-frames #2 and #3 in the FDD cell 322, respectively. The TDD cell 321 is configured by uplink sub-frames at the time points of downlink sub-frames #2 and #3 of the FDD cell 322. HARQ-ACKs for the PDSCHs 325 and 326 are transmitted in uplink sub-frames #7 and #8 of the TDD cell 321 according to an embodiment. That is, the HARQ-ACK for the PDSCH 325 is transmitted in uplink sub-frame #7 of the TDD cell 321 according to HARQ timing defined to match up with downlink sub-frame #1 of the TDD cell 321, which is the nearest downlink sub-frame among the downlink sub-frames before or after downlink sub-frame #2 in which the PDSCH 325 is scheduled. Further, the HARQ-ACK for the PDSCH 326 is transmitted in uplink sub-frame #8 of the TDD cell 321 according to HARQ timing defined to match up with downlink sub-frame #4 of the TDD cell 321, which is the nearest downlink sub-frame among the downlink sub-frames before or after downlink sub-frame #3 in which the PDSCH 326 is scheduled.

In an embodiment, when the PDSCHs 323 in the TDD cell 321 are scheduled in sub-frames #0 and/or #1, HARQ-ACKs for the PDSCHs 327 of the FDD cell 322 are multiplexed with the HARQ-ACKs for the PDSCHs 323 and are then transmitted in uplink sub-frame #7 of the TDD cell 321 (operation 324).

Referring to FIG. 3C, the Pcell 331 is configured to employ the TDD scheme and includes downlink sub-frames and uplink sub-frames configured according to TDD UL-DL configuration #2. The Scell 332 is configured to employ the FDD scheme, frequency f1 is used for the downlink transmission, and frequency f2 is used for the uplink transmission.

A PDSCH 335 is scheduled in downlink sub-frame #7 in the FDD cell 332. The TDD cell 331 is configured by an uplink sub-frame at the time point of downlink sub-frame #7 in the FDD cell 332. An HARQ-ACK for the PDSCH 335 is transmitted in uplink sub-frame #2 of the TDD cell 331 according to an embodiment. That is, the HARQ-ACK for the PDSCH 335 is transmitted in uplink sub-frame #2 of the TDD cell 331 according to HARQ timing defined to match up with downlink sub-frame #6 of the TDD cell 331, which is a downlink sub-frame having a smallest index between downlink sub-frames #6 and #8 corresponding to the nearest downlink sub-frames of the TDD cell 331 among the downlink sub-frames before or after downlink sub-frame #7 in which the PDSCH 335 is scheduled.

In an embodiment, when the PDSCHs 333 in the TDD cell 331 are scheduled in sub-frames #4, #5, #6, and #8, HARQ-ACKs for the PDSCHs 336 of the FDD cell 332 are multiplexed with the HARQ-ACKs for the PDSCHs 333 and are then transmitted in uplink sub-frame #2 of the TDD cell 331 (operation 334).

Referring to FIG. 3D, the Pcell 341 is configured to employ the TDD scheme and includes downlink sub-frames and uplink sub-frames configured according to TDD UL-DL configuration #3. The Scell 342 is configured to employ the FDD scheme, frequency f1 is used for the downlink transmission, and frequency f2 is used for the uplink transmission.

PDSCHs 345, 346, and 347 are scheduled in downlink sub-frame #2, #3, and #4 in the FDD cell 342. The TDD cell 341 is configured by uplink sub-frames at the time points of downlink sub-frames #2, #3, and #4 of the FDD cell 342. HARQ-ACKs for the PDSCHs 345, 346, and 347 are transmitted in uplink sub-frame #2 of the TDD cell 341 according to an embodiment. That is, the nearest downlink sub-frames among the downlink sub-frames before or after downlink sub-frame #2, #3, and #4 in which the PDSCHs 345, 346, and 347 are scheduled are downlink sub-frames #1 and #5 of the TDD cell 341. Since downlink sub-frames #1 and #5 of the TDD cell 341 are defined to correspond to the same HARQ timing, i.e. sub-frame #2, HARQ-ACKs for the PDSCHs 345, 346, and 347 are transmitted in uplink sub-frame #2 of the TDD cell 341 according to the defined same HARQ timing.

In an embodiment, when the PDSCHs 343 in the TDD cell 341 are scheduled in sub-frames #1, #5, and #6, HARQ-ACKs for the PDSCHs 348 of the FDD cell 342 are multiplexed with the HARQ-ACKs for the PDSCHs 343 and are then transmitted in uplink sub-frame #2 of the TDD cell 341 (operation 344).

Referring to FIG. 3E, the Pcell 351 is configured to employ the TDD scheme and includes downlink sub-frames and uplink sub-frames configured according to TDD UL-DL configuration #4. The Scell 352 is configured to employ the FDD scheme, frequency $f_1$ is used for the downlink transmission, and frequency $f_2$ is used for the uplink transmission.

PDSCHs 355 and 356 are scheduled in downlink sub-frames #2 and #3 in the FDD cell 352. The TDD cell 351 is configured by uplink sub-frames at the time points of downlink sub-frames #2 and #3 of the FDD cell 352. HARQ-ACKs for the PDSCHs 355 and 356 are transmitted in uplink sub-frame #2 of the TDD cell 351 according to an embodiment. The nearest downlink sub-frames among the downlink sub-frames before or after downlink sub-frames #2 and #3 in which the PDSCHs 355 and 356 are scheduled are downlink sub-frames #1 and #4 of the TDD cell 351, and HARQ timings defined in accordance with downlink sub-frames #1 and #4 of the TDD cell 351 are the same, which is uplink sub-frame #2 of the TDD cell 351. Therefore, according to the HARQ timing, HARQ-ACKs for the PDSCHs 355 and 356 are transmitted in uplink sub-frame #2 of the TDD cell 351.

In an embodiment, when the PDSCHs 333 in the TDD cell 351 are scheduled in sub-frames #0, #1, #4, and #5, HARQ-ACKs for the PDSCHs 357 of the FDD cell 352 are multiplexed with the HARQ-ACKs for the PDSCHs 353 and are then transmitted in uplink sub-frame #2 of the TDD cell 351 (operation 354).

Referring to FIG. 3F, the Pcell 361 is configured to employ the TDD scheme and includes downlink sub-frames and uplink sub-frames configured according to TDD UL-DL configuration #5. The Scell 362 is configured to employ the FDD scheme, frequency f1 is used for the downlink transmission, and frequency f2 is used for the uplink transmission.

A PDSCH 365 is scheduled in downlink sub-frame #2 in the FDD cell 362. The TDD cell 362 is configured by an uplink sub-frame at the time point of downlink sub-frame #2 of the FDD cell 361. An HARQ-ACK for the PDSCH 365 is transmitted in uplink sub-frame #2 of the TDD cell 361 according to an embodiment. That is, the nearest downlink sub-frames among the downlink sub-frames before or after downlink sub-frame #2 in which the PDSCH 365 is scheduled are downlink sub-frames #1 and #3 of the TDD cell 361. Downlink sub-frames #1 and #3 of the TDD cell 361 have the same HARQ timing defined to match up with them, which is uplink sub-frame #2 of the TDD cell 361. Therefore, according to the HARQ timing, an HARQ-ACK for the PDSCH 365 is transmitted in uplink sub-frame #2 of the TDD cell 361.

In an embodiment, when the PDSCHs 363 in the TDD cell 361 are scheduled in sub-frames #9, #0, #1, #3, #4, #5, #6, #7, and #8, HARQ-ACKs for the PDSCHs 366 of the FDD cell are multiplexed with the HARQ-ACKs for the PDSCHs 363 and are then transmitted in uplink sub-frame #2 of the TDD cell 361 (operation 364).

Referring to FIG. 3G, the Pcell 371 is configured to employ the TDD scheme and includes downlink sub-frames and uplink sub-frames configured according to TDD UL-DL configuration #6. The Scell 372 is configured to employ the FDD scheme, frequency $f_1$ is used for the downlink transmission, and frequency $f_2$ is used for the uplink transmission.

PDSCHs 375 and 376 are scheduled in downlink sub-frames #2 and #3 in the FDD cell 372. The TDD cell 372 is configured by uplink sub-frames at the time points of downlink sub-frames #2 and #3 of the FDD cell 371. HARQ-ACKs for the PDSCHs 375 and 376 are transmitted in uplink sub-frame #8 of the TDD cell 371 according to an embodiment. That is, the HARQ-ACK for the PDSCH 375 is transmitted in uplink sub-frame #8 of the TDD cell 371 according to HARQ timing defined to match up with downlink sub-frame #1 of the TDD cell 371, which is a downlink sub-frame nearest to downlink sub-frame #2 of the FDD cell 372 among the downlink sub-frames before or after downlink sub-frame #2 in which the PDSCH 375 is scheduled. Further, the HARQ-ACK for the PDSCH 376 is transmitted in uplink sub-frame #8 of the TDD cell 371 according to HARQ timing defined to match up with downlink sub-frame #1 of the TDD cell 371, which is a downlink sub-frame having a smallest index between downlink sub-frames #1 and #5, which are downlink sub-frames of the TDD cell 371 nearest to downlink sub-frame #3 of the FDD cell 372 among the downlink sub-frames before or after downlink sub-frame #3 in which the PDSCH 376 is scheduled. Further, the HARQ-ACK for the PDSCH 377 is transmitted in uplink sub-frame #2 of the TDD cell 371 according to HARQ timing defined to match up with downlink sub-frame #5 of the TDD cell 371, which is a downlink sub-frame nearest to downlink sub-frame #4 of the FDD cell 372 among the downlink sub-frames before or after downlink sub-frame #4 in which the PDSCH 377 is scheduled.

In an embodiment, when the PDSCH 373 in the TDD cell 371 is scheduled in sub-frame #1, HARQ-ACKs for the PDSCHs 378 of the FDD cell 372 are multiplexed with the HARQ-ACK for the PDSCH 373 and are then transmitted in uplink sub-frame #8 of the TDD cell 371 (operation 374).

Table 2 shows sub-frames (n−k) of an FDD cell receiving PDSCHs, HARQ-ACKs of which should be transmitted in uplink sub-frame n of a TDD cell according to an embodiment based on TDD UL-DL configurations in FIGS. 3A to 3G.

HARQ-ACK bits. For example, although the downlink sub-frames, HARQ-ACKs of which are transmitted in uplink sub-frame #2 of TDD UL-DL configuration #2, are in the sequence of downlink sub-frames #4 (=12−8), #5 (=12−7), #7 (=12−5), #8 (=12−4), and #6 (=12−6) according to Table 2, they may be in a sequence of sub-frames #4, #5, #6, #7, and #8 according to the sequence for transmission of HARQ-ACKs.

FIGS. 4A to 4G illustrate control channel transmission according to an embodiment of the present disclosure. Hereinafter, a method of applying HARQ timing when an uplink control channel for data in a downlink sub-frame of an FDD cell is transmitted in a TDD cell at a time point at which the TDD cell is configured by an uplink sub-frame will be described based on the seven example situations shown in FIGS. 4A to 4G. Hereinafter, FIGS. 4A to 4G are collectively referred to as FIG. 4.

Figure 4A:
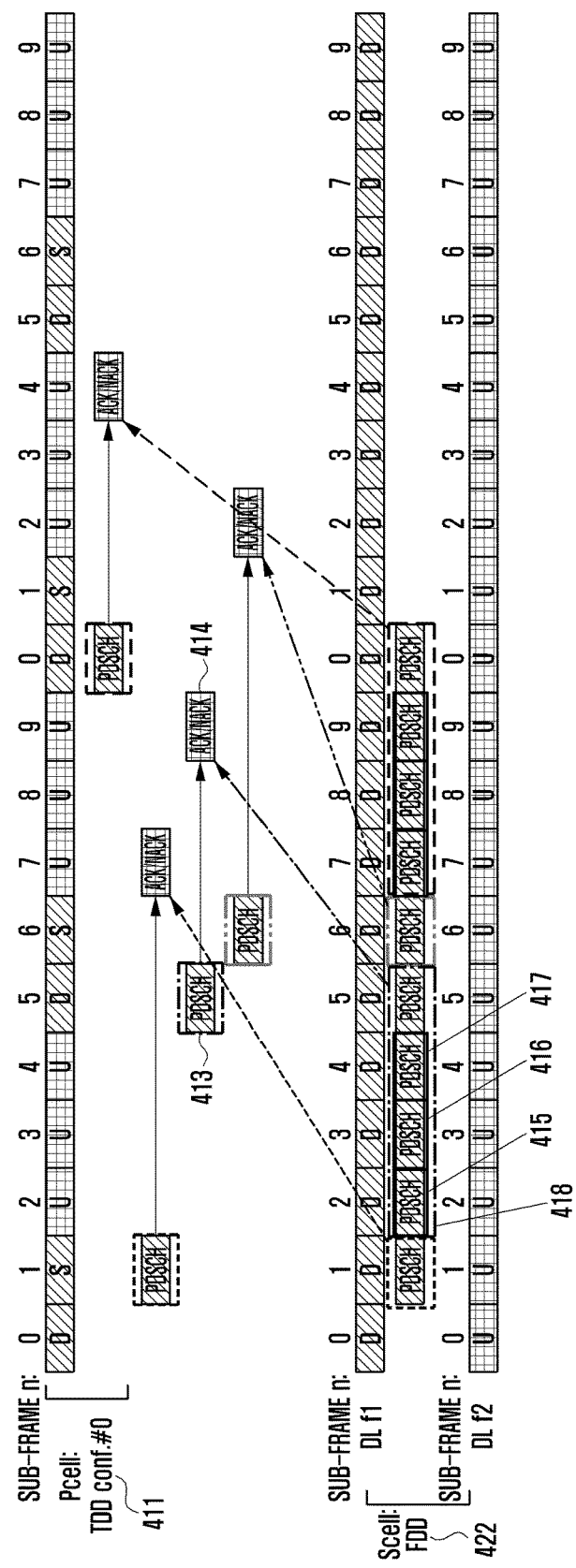
FIGS. 4A to 4G illustrate control channel transmission according to an embodiment of the present disclosure.

Referring to FIG. 4A, the Pcell 411 is configured to employ the TDD scheme and includes downlink sub-frames and uplink sub-frames configured according to TDD UL-DL configuration #0. The Scell 412 is configured to employ the FDD scheme, frequency $f_1$ is used for the downlink transmission, and frequency $f_2$ is used for the uplink transmission.

PDSCHs 415, 416, and 417 are scheduled in downlink sub-frame #2, #3, and #4 in the FDD cell 412. The TDD cell 412 is configured by uplink sub-frames at the time points of downlink sub-frames #2, #3, and #4 of the FDD cell 411. HARQ-ACKs for the PDSCHs 415, 416, and 417 are transmitted in uplink sub-frame #9 of the TDD cell 411 according to an embodiment of the present disclosure. That is, the nearest downlink sub-frame among the downlink sub-frames after downlink sub-frames #2, #3, and #4 in which the PDSCHs 415, 416, and 417 are scheduled is downlink sub-frame #5 of the TDD cell 411. According to the HARQ timing defined for downlink sub-frame #5 of the TDD cell 411, HARQ-ACKs for the PDSCHs 415, 416, and 417 are transmitted in uplink sub-frame #9 of the TDD cell 411.

In an embodiment, when the PDSCH 413 in the TDD cell 411 is scheduled in sub-frame #5, HARQ-ACKs for the PDSCHs 418 of the FDD cell are multiplexed with the HARQ-ACK for the PDSCH 413 and are then transmitted in uplink sub-frame #9 of the TDD cell 411 (operation 414).

Figure 4B:
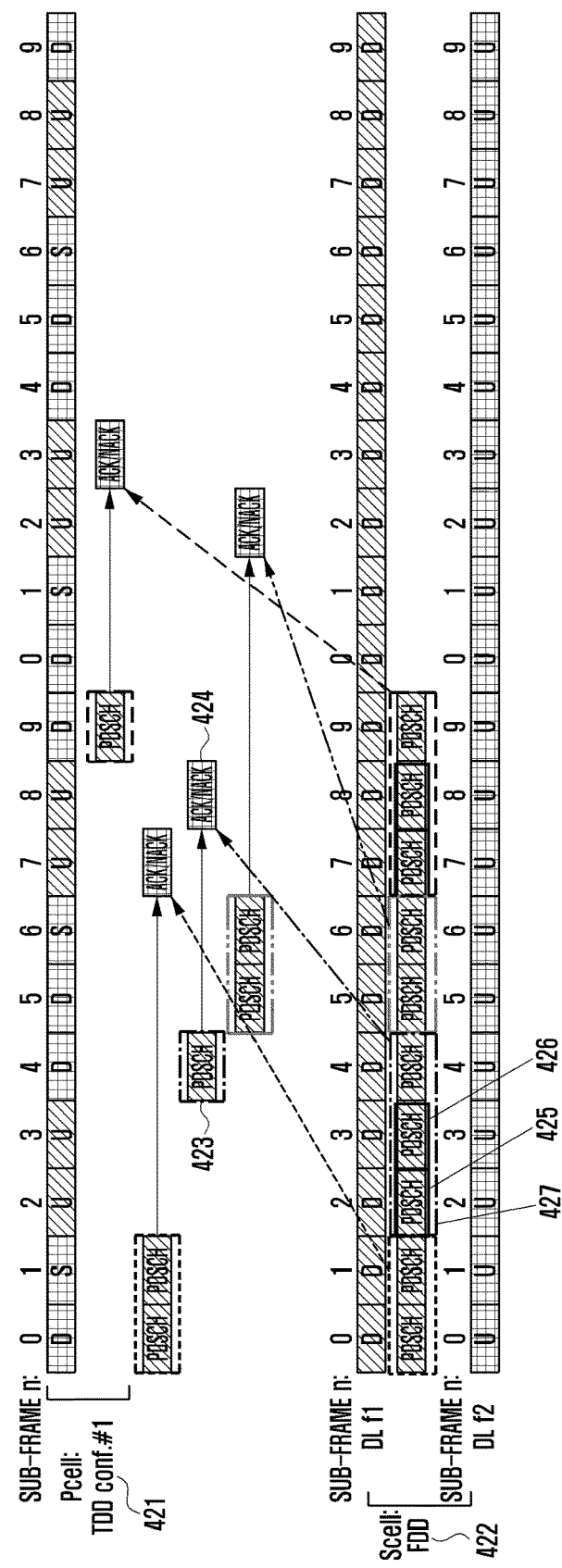

Referring to FIG. 4B, the Pcell 421 is configured to employ the TDD scheme and includes downlink sub-frames and uplink sub-frames configured according to TDD UL-DL configuration #1. The Scell 422 is configured to employ the FDD scheme, frequency $f_1$ is used for the downlink transmission, and frequency $f_2$ is used for the uplink transmission.

When PDSCHs 425 and 426 are scheduled in downlink sub-frames #2 and #3 of the FDD cell 422 at which the TDD

TABLE 2

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5, 4 | — | 5, 4 | — | — | 6, 5, 4 | — | 5, 4 |
| 1 | — | — | 7, 6, 5 | 5, 4 | — | — | — | 7, 6, 5 | 5, 4 | — |
| 2 | — | — | 8, 7, 5, 4, 6 | — | — | — | — | 8, 7, 5, 4, 6 | — | — |
| 3 | — | — | 10, 9, 8, 7, 6, 11 | 6, 5 | 5, 4 | — | — | — | — | — |
| 4 | — | — | 12, 10, 9, 8, 7, 11 | 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 8, 7 | 7, 6 | 6, 5 | — | — | 7 | 7, 6, 5 | — |

For example, when the Pcell is configured according to UL-DL configuration #4, HARQ-ACKs received through uplink sub-frame #2 are HARQ-ACKs for PDSCHs of downlink sub-frames located by 12, 10, 9, 8, 7, and 11 sub-frames prior to uplink sub-frame #2, respectively.

The sequence of the sub-frames (n−k) of Table 2 may be changed according to the transmission sequence of the cell 421 is configured by uplink sub-frames, HARQ-ACKs for the PDSCHs 425 and 426 are transmitted in uplink sub-frame #8 of the TDD cell 421 according to an embodiment. That is, the nearest downlink sub-frame among the downlink sub-frames after downlink sub-frames #2 and #3 in which the PDSCHs 425 and 426 are scheduled is downlink sub-frame #4 of the TDD cell 421. According to the HARQ timing defined to match up with downlink sub-frame #4 of the TDD cell 421, HARQ-ACKs for the PDSCHs 425 and 426 are transmitted in uplink sub-frame #8 of the TDD cell 421.

In an embodiment, when the PDSCH 273 in the TDD cell 421 is scheduled in sub-frame #4, HARQ-ACKs for the PDSCHs 427 of the FDD cell 422 are multiplexed with the HARQ-ACK for the PDSCH 423 and are then transmitted in uplink sub-frame #8 of the TDD cell 421 (operation 424).

Figure 4C:
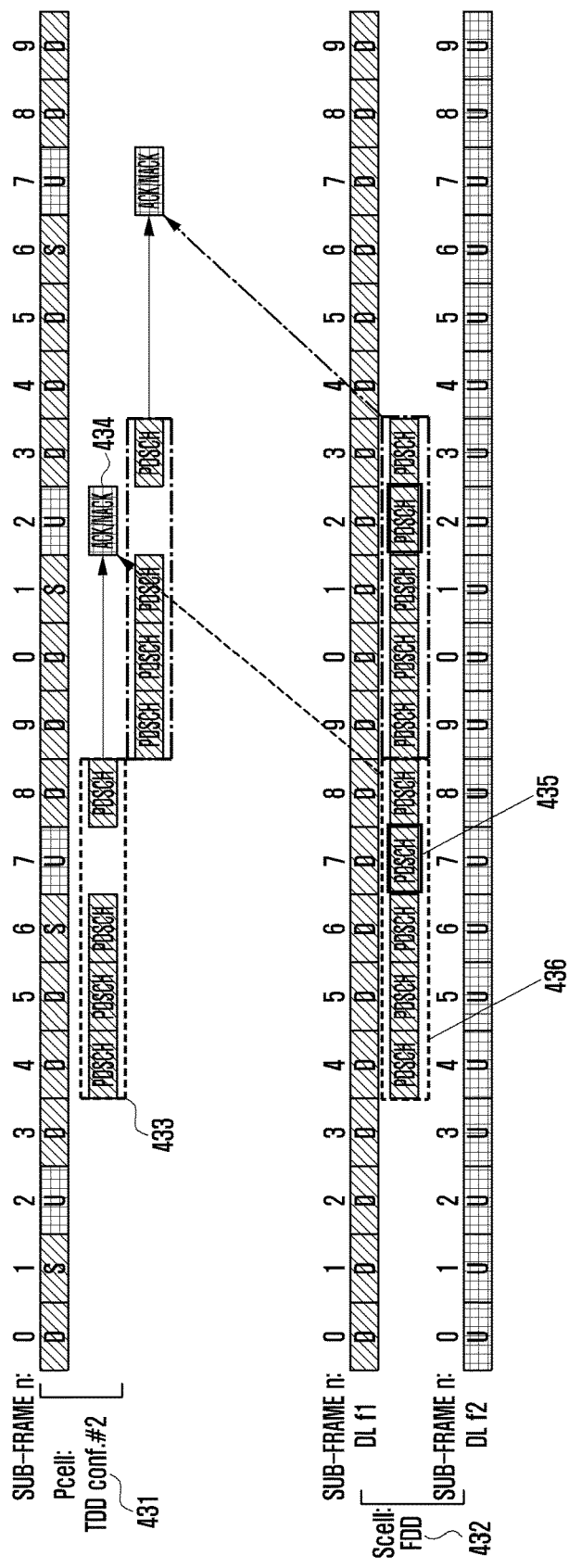

Referring to FIG. 4C, the Pcell 431 is configured to employ the TDD scheme and includes downlink sub-frames and uplink sub-frames configured according to TDD UL-DL configuration #2. The Scell 432 is configured to employ the FDD scheme, frequency $f_1$ is used for the downlink transmission, and frequency $f_2$ is used for the uplink transmission.

A PDSCH 435 is scheduled in downlink sub-frames #7 in the FDD cell 432. The TDD cell 431 is configured by an uplink sub-frame at the time point of downlink sub-frame #7 in the FDD cell 432. An HARQ-ACK for the PDSCH 435 is transmitted in uplink sub-frame #2 of the TDD cell 431 according to an embodiment. A downlink sub-frame nearest to downlink sub-frame #7 among the downlink sub-frames after downlink sub-frame #7 in which the PDSCH 435 is scheduled is downlink sub-frame #8 of the TDD cell 431. According to the HARQ timing defined to match up with downlink sub-frame #8 of the TDD cell 431, the HARQ-ACK for the PDSCH 435 is transmitted in uplink sub-frame #2 of the TDD cell 431.

In an embodiment, when the PDSCHs 433 in the TDD cell 431 are scheduled in sub-frames #4, #5, #6, and #8, HARQ-ACKs for the PDSCHs 436 of the FDD cell 432 are multiplexed with the HARQ-ACKs for the PDSCHs 433 and are then transmitted in uplink sub-frame #2 of the TDD cell 431 (operation 434).

Figure 4D:
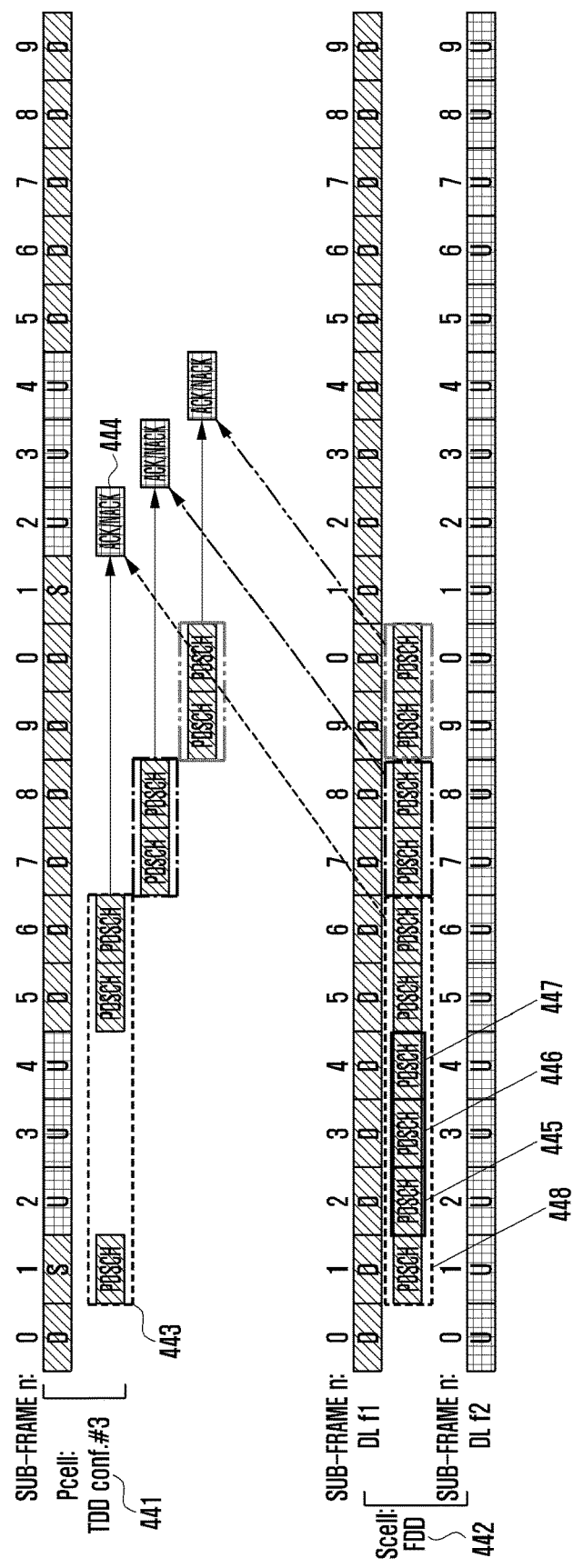

Referring to FIG. 4D, the Pcell 441 is configured to employ the TDD scheme and includes downlink sub-frames and uplink sub-frames configured according to TDD UL-DL configuration #3. The Scell 442 is configured to employ the FDD scheme, frequency $f_1$ is used for the downlink transmission, and frequency $f_2$ is used for the uplink transmission.

PDSCHs 445, 446, and 447 are scheduled in downlink sub-frame #2, #3, and #4 in the FDD cell 442. The TDD cell 442 is configured by uplink sub-frames at the time points of downlink sub-frames #2, #3, and #4 of the FDD cell 441. HARQ-ACKs for the PDSCHs 445, 446, and 447 are transmitted in uplink sub-frame #2 of the TDD cell 441 according to an embodiment of the present disclosure. That is, a downlink sub-frame nearest to downlink sub-frames #2, #3, and #4 among the downlink sub-frames after downlink sub-frames #2, #3, and #4 in which the PDSCHs 445, 446, and 447 are scheduled is downlink sub-frame #5 of the TDD cell 411. According to the HARQ timing defined to match up with downlink sub-frame #5 of the TDD cell 441, HARQ-ACKs for the PDSCHs 445, 446, and 447 are transmitted in uplink sub-frame #2 of the TDD cell 441.

In an embodiment, when the PDSCHs 443 in the TDD cell 441 are scheduled in sub-frames #1, #5, and #6, HARQ-ACKs for the PDSCHs 448 of the FDD cell 442 are multiplexed with the HARQ-ACKs for the PDSCHs 443 and are then transmitted in uplink sub-frame #2 of the TDD cell 441 (operation 444).

Figure 4E:
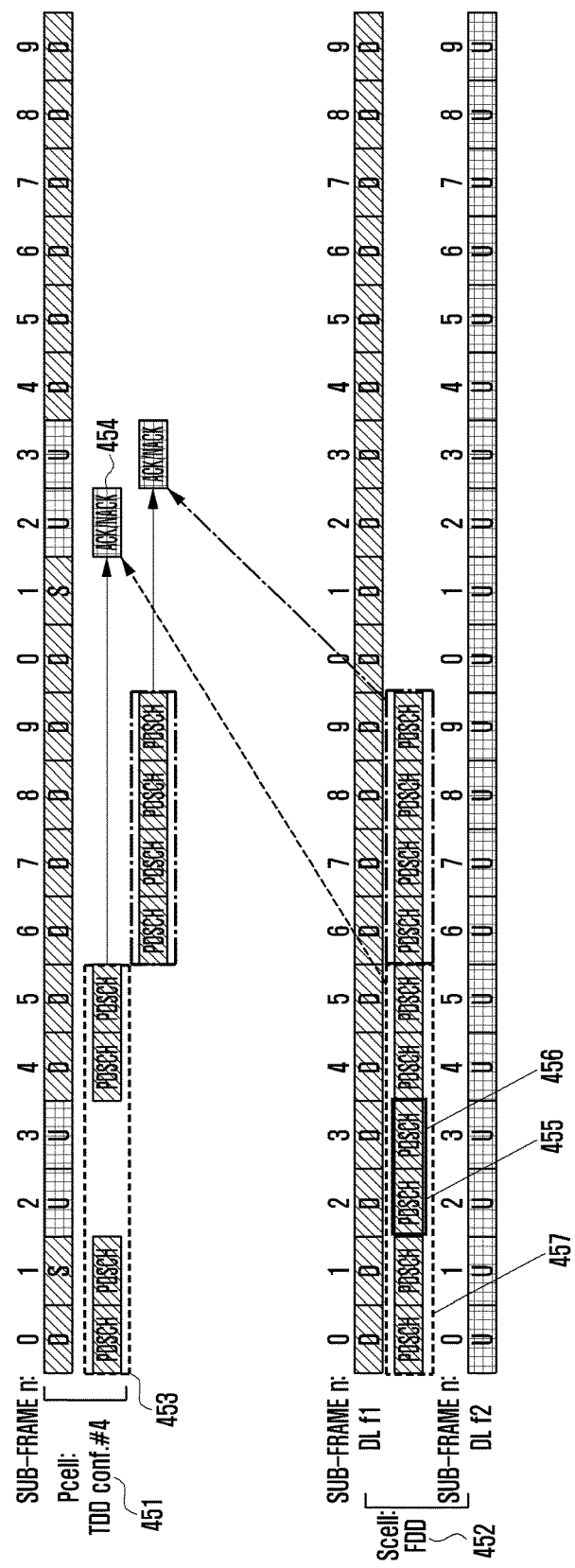

Referring to FIG. 4E, the Pcell 451 is configured to employ the TDD scheme and includes downlink sub-frames and uplink sub-frames configured according to TDD UL-DL configuration #4. The Scell 452 is configured to employ the FDD scheme, frequency $f_1$ is used for the downlink transmission, and frequency $f_2$ is used for the uplink transmission.

PDSCHs 455 and 456 are scheduled in downlink sub-frames #2 and #3 in the FDD cell 452. The TDD cell 451 is configured by uplink sub-frames at the time points of downlink sub-frames #2 and #3 of the FDD cell 452. HARQ-ACKs for the PDSCHs 455 and 456 are transmitted in uplink sub-frame #2 of the TDD cell 451 according to an embodiment. That is, a downlink sub-frame nearest to downlink sub-frames #2 and #3 in which the PDSCHs 455 and 456 are scheduled, among the downlink sub-frames after downlink sub-frames #2 and #3, is downlink sub-frame #4 of the TDD cell 451. According to the HARQ timing defined to match up with downlink sub-frame #4 of the TDD cell 451, HARQ-ACKs for the PDSCHs 455 and 456 are transmitted in uplink sub-frame #2 of the TDD cell 451.

In an embodiment, when the PDSCHs 453 in the TDD cell 451 are scheduled in sub-frames #0, #1, #4, and #5, HARQ-ACKs for the PDSCHs 457 of the FDD cell 452 are multiplexed with the HARQ-ACKs for the PDSCHs 453 and are then transmitted in uplink sub-frame #2 of the TDD cell 451 (operation 454).

Figure 4F:
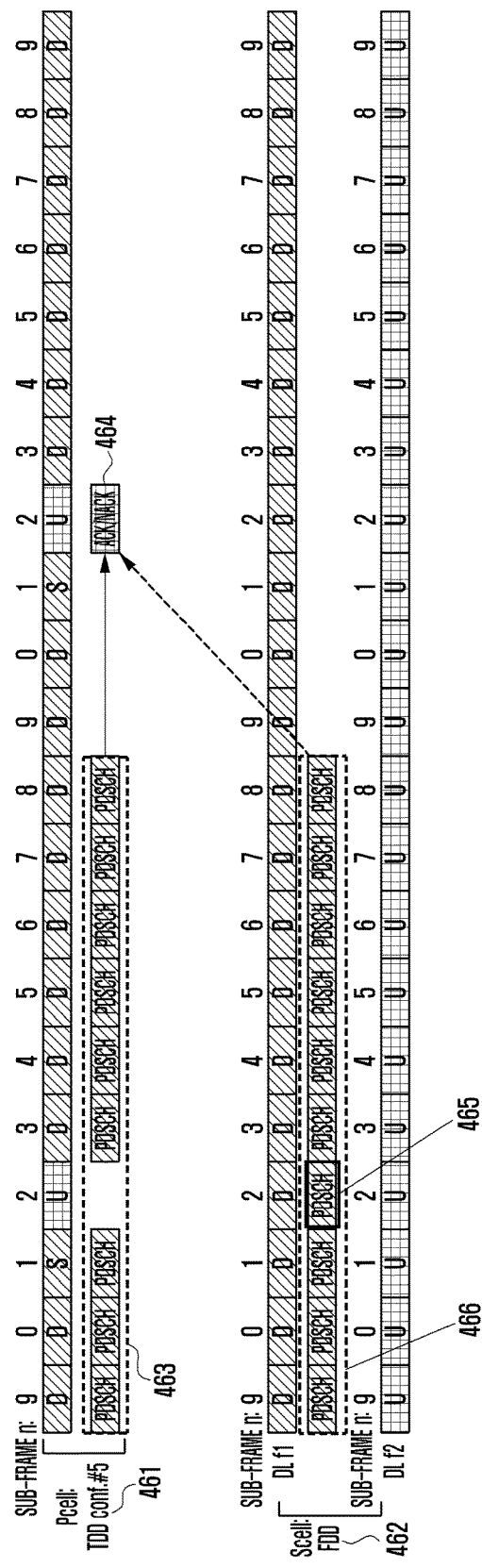

Referring to FIG. 4F, the Pcell 461 is configured to employ the TDD scheme and includes downlink sub-frames and uplink sub-frames configured according to TDD UL-DL configuration #5. The Scell 462 is configured to employ the FDD scheme, frequency $f_1$ is used for the downlink transmission, and frequency $f_2$ is used for the uplink transmission.

A PDSCH 465 is scheduled in downlink sub-frame #2 in the FDD cell 462. The TDD cell 461 is configured by an uplink sub-frame at the time point of downlink sub-frame #2 of the FDD cell 462. An HARQ-ACK for the PDSCH 465 is transmitted in uplink sub-frame #2 of the TDD cell 461 according to an embodiment. That is, a downlink sub-frame nearest to downlink sub-frame #2 among the downlink sub-frames after downlink sub-frame #2 in which the PDSCH 465 is scheduled is downlink sub-frame #3 of the TDD cell 461. According to the HARQ timing defined to match up with downlink sub-frame #3 of the TDD cell 461, the HARQ-ACK for the PDSCH 465 is transmitted in uplink sub-frame #2 of the TDD cell 461.

In an embodiment, when the PDSCHs 463 in the TDD cell 461 are scheduled in sub-frames #9, #0, #1, #3, #4, #5, #6, #7, and #8, HARQ-ACKs for the PDSCHs 466 of the FDD cell are multiplexed with the HARQ-ACKs for the PDSCHs 463 and are then transmitted in uplink sub-frame #2 of the TDD cell 461 (operation 464).

Figure 4G:
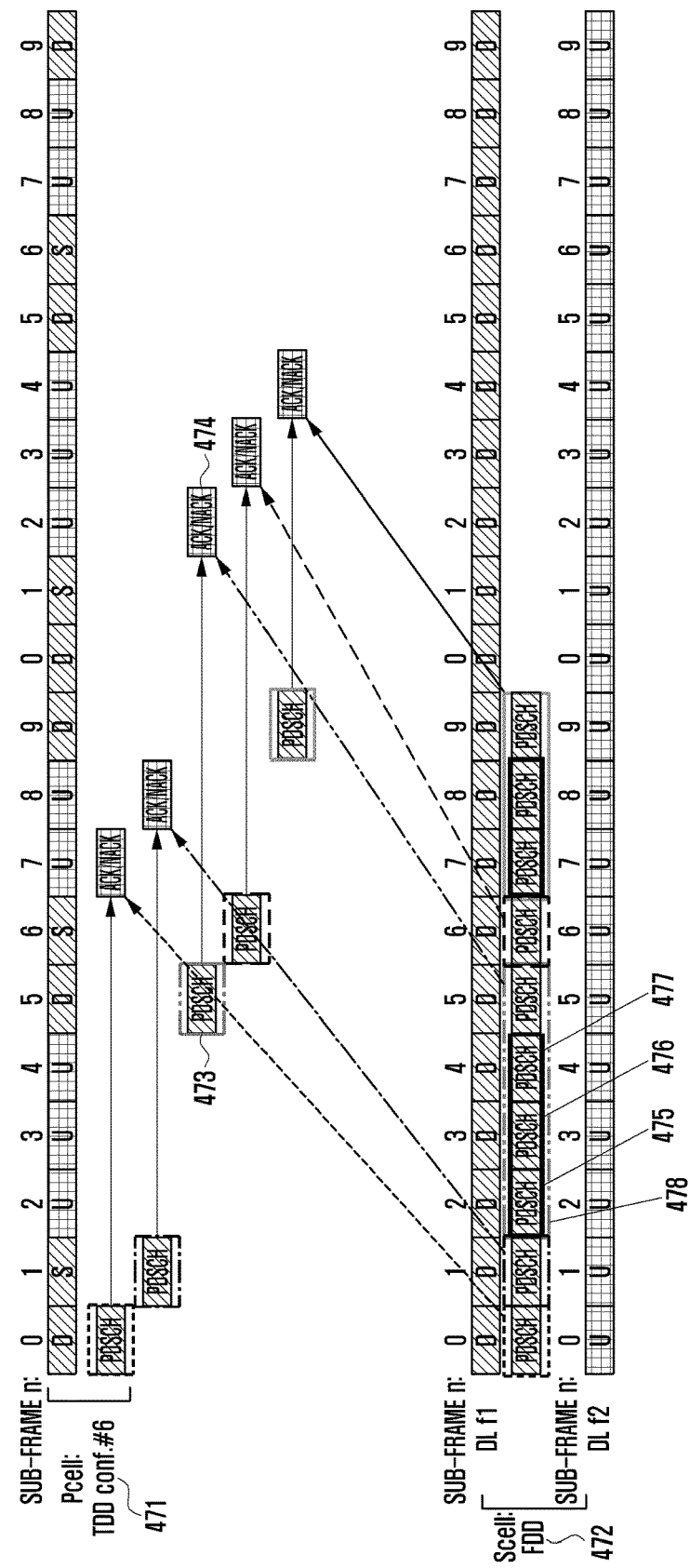

Referring to FIG. 4G, the Pcell 471 is configured to employ the TDD scheme and includes downlink sub-frames and uplink sub-frames configured according to TDD UL-DL configuration #6. The Scell 472 is configured to employ the FDD scheme, frequency $f_1$ is used for the downlink transmission, and frequency $f_2$ is used for the uplink transmission.

PDSCHs 475, 476, and 477 are scheduled in downlink sub-frame #2, #3, and #4 in the FDD cell 472. The TDD cell 471 is configured by uplink sub-frames at the time points of downlink sub-frames #2, #3, and #4 of the FDD cell 472.

HARQ-ACKs for the PDSCHs 475, 476, and 477 are transmitted in uplink sub-frame #2 of the TDD cell 471 according to an embodiment of the present disclosure. That is, a downlink sub-frame nearest to downlink sub-frames #2, #3, and #4 among the downlink sub-frames after downlink sub-frames #2, #3, and #4 in which the PDSCHs 475, 476, and 477 are scheduled is downlink sub-frame #5 of the TDD cell 471. According to the HARQ timing defined to match up with downlink sub-frame #5 of the TDD cell 471, HARQ-ACKs for the PDSCHs 475, 476, and 477 are transmitted in uplink sub-frame #2 of the TDD cell 471.

In an embodiment, when the PDSCH 473 in the TDD cell 471 is scheduled in sub-frame #5, HARQ-ACKs for the PDSCHs 478 of the FDD cell 472 are multiplexed with the HARQ-ACK for the PDSCH 473 and are then transmitted in uplink sub-frame #2 of the TDD cell 471 (operation 474).

Table 3 shows sub-frames (n–k) of an FDD cell receiving PDSCHs, uplink HARQ-ACKs of which should be transmitted in uplink sub-frame n of a TDD cell according to an embodiment based on TDD UL-DL configurations in FIGS. 4A to 4G.

embodiment, information of a sub-frame nearest to the sub-frame in which data is actually received is used regardless of preceding or following.

Although the above description on the process of calculating/obtaining a sub-frame for transmission of a feedback corresponding to a sub-frame, in which data is received, according to one or more embodiments is somewhat complicated, a mobile station or a base station may actually obtain the sub-frame for transmission of the feedback by using only the mapping relation of Table 1, 2, or 3.

When HARQ-ACKs for PDSCHs in a TDD cell (Pcell) and HARQ-ACKs for PDSCHs in an FDD cell (Scell) are multiplexed and transmitted in an uplink sub-frame of the TDD cell in the embodiments described with reference to FIGS. 2A to 4G, the following methods may be used according to embodiments of the present disclosure.

According to an embodiment of the present disclosure, when a TDD cell and an FDD cell are subjected to a carrier aggregation, PUCCH format 3 could always used, instead of PUCCH format 1b with channel selection, for HARQ-ACK.

Since PUCCH format 3 allows transmission of a maximum of 20 bits of information, HARQ-ACKs can be trans-

TABLE 3

| UL-DL Configuration | Sub-frame n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 7, 6, 5, 4 | — | — | 6 | — | 7, 6, 5, 4 |
| 1 | — | — | 7, 6 | 6, 5, 4 | — | — | — | 7, 6 | 6, 5, 4 | — |
| 2 | — | — | 8, 7, 5, 4, 6 | — | — | — | — | 8, 7, 5, 4, 6 | — | — |
| 3 | — | — | 10, 9, 8, 7, 6, 11 | 6, 5 | 5, 4 | — | — | — | — | — |
| 4 | — | — | 12, 10, 9, 8, 7, 11 | 6, 5, 4, 7 | — | — | — | — | — | — |
| 5 | — | — | 13, 12, 10, 9, 8, 7, 5, 4, 11, 6 | — | — | — | — | — | — | — |
| 6 | — | — | 10, 9, 8, 7 | 7 | 7, 6, 5 | — | — | 7 | 7 | — |

For example, when the Pcell is configured according to UL-DL configuration #4, HARQ-ACKs received through uplink sub-frame #2 are HARQ-ACKs for PDSCHs of downlink sub-frames located by 12, 10, 9, 8, 7, and 11 sub-frames prior to uplink sub-frame #2, respectively.

The sequence of the sub-frames (n–k) of Table 3 may be changed according to the transmission sequence of the HARQ-ACK bits. For example, although the downlink sub-frames, HARQ-ACKs of which are transmitted in uplink sub-frame #2 of TDD UL-DL configuration #2, are in the sequence of downlink sub-frames #4 (=12–8), #5 (=12–7), #7 (=12–5), #8 (=12–4), and #6 (=12–6) according to Table 3, they may be in a sequence of sub-frames #4, #5, #6, #7, and #8 according to the sequence for transmission of HARQ-ACKs.

The schemes according to one or more embodiments of the present disclosure are common in that a time point for transmission of a feedback (HARQ-ACK/NACK), i.e. a feedback sub-frame, of a PDSCH is determined according to the time point (timing) of the sub-frame at which a mobile station receives the PDSCH. However, one or more embodiments show small differences in specific schemes of determination of the sub-frame. In all the three schemes, information of a sub-frame (adjacent sub-frame) nearest to the sub-frame in which data is actually received is used. However, information of a nearest sub-frame preceding the sub-frame in which data is actually received is used in an embodiment, while information of a nearest sub-frame following the sub-frame in which data is actually received is used in another embodiment. According to one or more mitted in the case of a carrier aggregation of a TDD cell and an FDD cell. However, when a transmission mode for two codewords is configured in a TDD cell and an FDD cell and an HARQ-ACK to be transmitted has a size exceeding 20 bits, it is required to apply a spatial bundling to prevent the size of the HARQ-ACK from exceeding 20 bits and the HARQ-ACK is transmitted through PUCCH format 3 after the spatial bundling is applied. That is, the HARQ-ACKs for the two codewords are compressed into one HARQ-ACK through an AND operation. When the size of the HARQ-ACK exceeds 20 bits even after the spatial bundling is applied, an HARQ-ACK for a downlink sub-frame corresponding to the HARQ-ACK larger than 20 bits is not transmitted through PUCCH format 3. That is, transmission of some HARQ-ACKs may be omitted. When transmission of some HARQ-ACKs is omitted, the HARQ-ACKs, transmission of which is to be omitted, may be sequentially selected from all the HARQ-ACKs to be transmitted, according to a normal temporal sequence of corresponding downlink sub-frames. According to a modified embodiment, when transmission of some HARQ-ACKs is omitted, the HARQ-ACKs, transmission of which is to be omitted, may be sequentially selected from all the HARQ-ACKs to be transmitted, according to an inverse temporal sequence of corresponding downlink sub-frames. According to another modified embodiment, when transmission of some HARQ-ACKs is omitted, information on a condition of the HARQ-ACK, transmission of which is omitted, may be transferred through a higher layer signal. According to another modified embodiment, when transmission of some HARQ-ACKs is omitted, a feedback signal corresponding to an HARQ-ACK, transmission of which is omitted, may be transferred through a higher layer signal.

According to an embodiment of the present disclosure, when a TDD cell and an FDD cell are subjected to a carrier aggregation, an HARQ-ACK may be transmitted using PUCCH format 1b with channel selection. However, when the number of downlink sub-frames, HARQ-ACKs of which should be transmitted, exceeds four in a TDD cell or an FDD cell, PUCCH format 3 is used. That is, PUCCH format 1b with channel selection may be configured to be used only in a embodiment in which TDD UL-DL configurations #1, #2, and #7 are used in the embodiments shown in FIGS. 2, 3, and 4, while PUCCH format 3 is used in a embodiment in which TDD UL-DL configurations #3, #4, #5, and #6 are used in the embodiments shown in FIGS. 2, 3, and 4, since the number of downlink sub-frames, HARQ-ACKs of which should be transmitted, may exceed four in the latter embodiment.

In the embodiment where the PUCCH format 1b with channel selection is used, when the number of downlink sub-frames of a TDD cell and the number of downlink sub-frames of an FDD cell, HARQ-ACKs of which should be transmitted in one uplink sub-frame, are different from each other, the PUCCH format 1b with channel selection is applied based on the larger number of downlink sub-frames. When the smaller number of downlink sub-frames is adjusted to the larger number of downlink sub-frames, Discontinuous Transmission (DT) is mapped.

Since use of PUCCH format 3 allows transmission of a maximum of 20 bits of information, HARQ-ACKs in the case of a carrier aggregation of a TDD cell and an FDD cell can be transmitted. However, when a transmission mode for transmission of two codewords is configured in a TDD cell and an FDD cell and an HARQ-ACK to be transmitted has a size exceeding 20 bits, it is required to apply a spatial bundling to prevent the size of the HARQ-ACK from exceeding 20 bits and the HARQ-ACK is transmitted through PUCCH format 3 after the spatial bundling is applied. That is, the HARQ-ACKs for the two codewords are compressed into one HARQ-ACK through an AND operation. When the size of the HARQ-ACK exceeds 20 bits even after the spatial bundling is applied, an HARQ-ACK for a downlink sub-frame corresponding to the HARQ-ACK larger than 20 bits is not transmitted through PUCCH format 3. That is, transmission of some HARQ-ACKs may be omitted. When transmission of some HARQ-ACKs is omitted, the HARQ-ACKs, transmission of which is to be omitted, may be sequentially selected from all the HARQ-ACKs to be transmitted, according to a normal temporal sequence of corresponding downlink sub-frames. According to a modified embodiment, when transmission of some HARQ-ACKs is omitted, the HARQ-ACKs, transmission of which is to be omitted, may be sequentially selected from all the HARQ-ACKs to be transmitted, according to an inverse temporal sequence of corresponding downlink sub-frames. According to another modified embodiment, when transmission of some HARQ-ACKs is omitted, information on a condition of the HARQ-ACK, transmission of which is omitted, may be transferred through a higher layer signal. According to another modified embodiment, when transmission of some HARQ-ACKs is omitted, a feedback signal corresponding to an HARQ-ACK, transmission of which is omitted, may be transferred through a higher layer signal.

According to an embodiment of the present disclosure, when a TDD cell and an FDD cell are subjected to a carrier aggregation, a HARQ-ACK could always be transmitted using PUCCH format 1b with channel selection.

When the number of downlink sub-frames, HARQ-ACKs of which should be transmitted in one uplink sub-frame in a TDD cell of an FDD cell, exceeds four, PUCCH format 1b with channel selection is not used for transmission of transmission of HARQ-ACKs for downlink sub-frames corresponding to the HARQ-ACKs, the number of which exceeds four. That is, transmission of some HARQ-ACKs may be omitted. When transmission of some HARQ-ACKs is omitted, the HARQ-ACKs, transmission of which is to be omitted, may be sequentially selected from all the HARQ-ACKs to be transmitted, according to a normal temporal sequence of corresponding downlink sub-frames. According to a modified embodiment, when transmission of some HARQ-ACKs is omitted, the HARQ-ACKs, transmission of which is to be omitted, may be sequentially selected from all the HARQ-ACKs to be transmitted, according to an inverse temporal sequence of corresponding downlink sub-frames. According to another modified embodiment, when transmission of some HARQ-ACKs is omitted, information on a condition of the HARQ-ACK, transmission of which is omitted, may be transferred through a higher layer signal. According to another modified embodiment, when transmission of some HARQ-ACKs is omitted, a feedback signal corresponding to an HARQ-ACK, transmission of which is omitted, may be transferred through a higher layer signal. Otherwise, a base station may not schedule a downlink sub-frame of the FDD cell at a time point at which the TDD cell is configured by an uplink sub-frame, so as to select the downlink sub-frame as a downlink sub-frame, an HARQ-ACK of which is not transmitted. Therefore, at that time point, the FDD cell can be used only in the uplink like the TDD cell, even though it is an FDD cell.

Figure 5A:
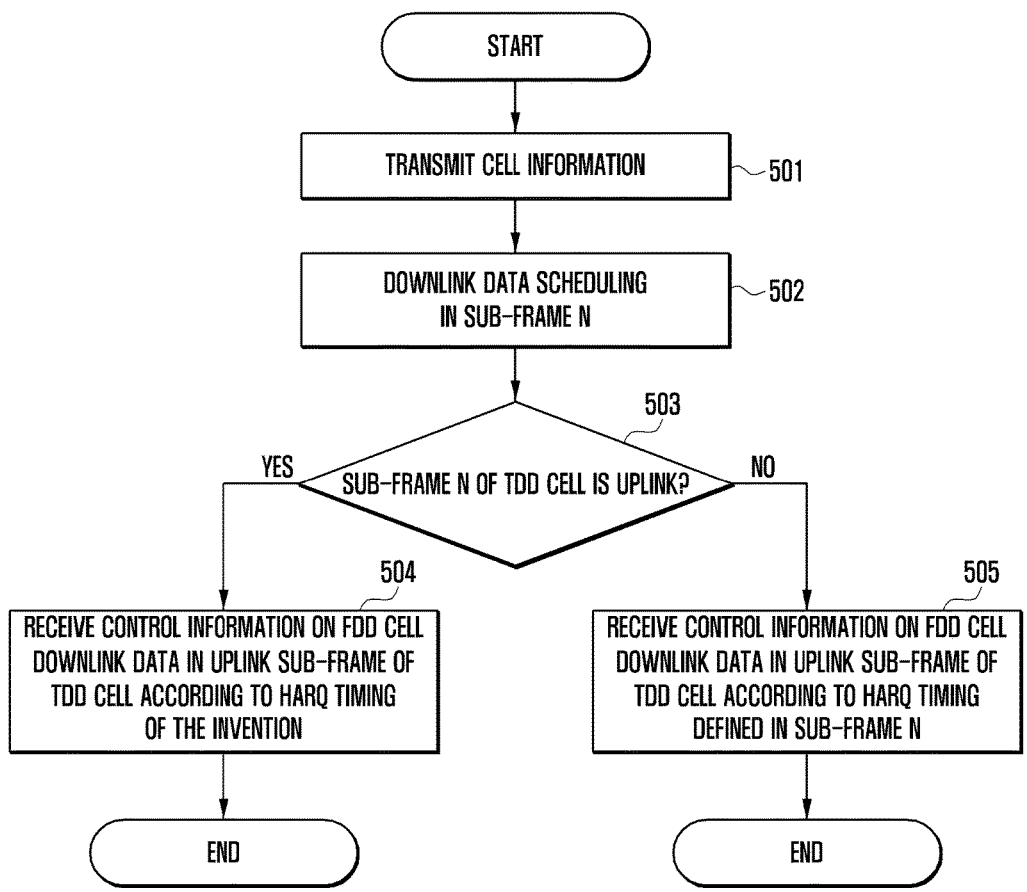
FIG. 5A illustrates a process of transmitting a control channel by a base station according to one of an embodiment of the present disclosure.

FIG. 5A illustrates a process of transmitting a control channel by a base station according to an embodiment of the present disclosure.

Figure 5B:
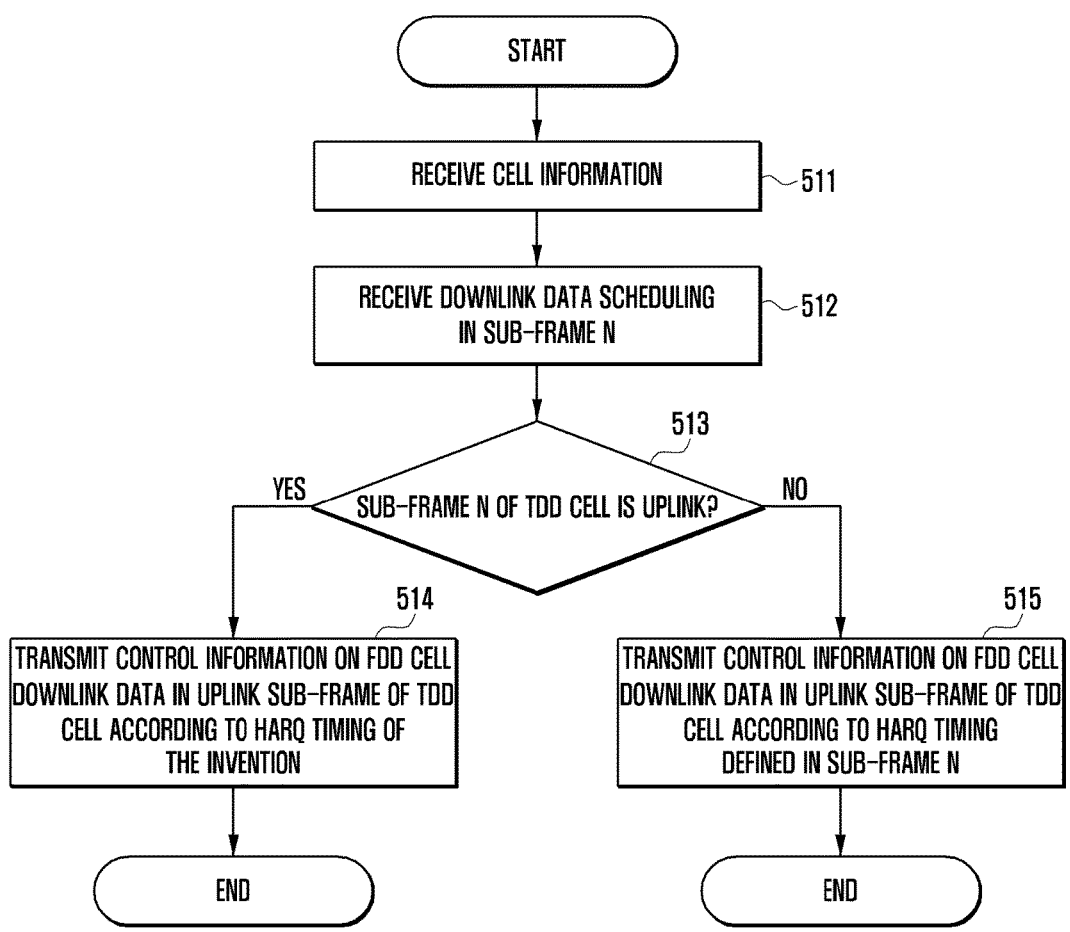
FIG. 5B illustrates a process of transmitting a control channel by a mobile station according to an embodiment of the present disclosure.

FIG. 5B illustrates a process of transmitting a control channel by a mobile station according to an embodiment of the present disclosure.

Referring to FIGS. 5A and 5B, operations of a base station and a mobile station for applying uplink control channel transmission timing of an FDD cell when a TDD cell transmits an uplink control channel for downlink data of the FDD cell will be described hereinafter.

Referring to FIG. 5A, an operation of the base station is described.

In block 501, the base station transmits information on the FDD cell and information on the TDD cell to the mobile station. The information on the FDD cell and the information on the TDD cell may include uplink and downlink frequency information of the FDD cell, and may include UL-DL configuration information of the TDD cell. The information on the FDD cell and the information on the TDD cell are transmitted to the mobile station through system information or higher layer information. As used herein, the TDD cell is Pcell and the FDD cell is Scell.

In block 502, the base station determines scheduling of downlink data in the FDD cell and the TDD cell in sub-frame #n for the mobile station. Next, in block 503, the base station determines whether sub-frame #n of the TDD cell is an uplink sub-frame. As a result of the determination in block 503, when sub-frame #n of the TDD cell is an uplink sub-frame, the process proceeds to block 504. In block 504, the base station receives an HARQ-ACK for a PDSCH transmitted in sub-frame #n of the FDD cell in a corresponding uplink sub-frame of the TDD cell determined based on one of the schemes according to an embodiment.

As a result of the determination in block 503, when the sub-frame of the TDD cell is not an uplink sub-frame, the base station receives an HARQ-ACK for a PDSCH transmitted in sub-frame #n of the FDD cell in an uplink sub-frame of the TDD cell according to HARQ timing defined to match up with the sub-frame #n of the TDD cell in block 505.

Referring to FIG. 5B, an operation of the mobile station is described.

In block 511, the mobile station receives information on the FDD cell and information on the TDD cell from the base station. The information on the FDD cell and the information on the TDD cell may include uplink and downlink frequency information of the FDD cell, and may include UL-DL configuration information of the TDD cell. The information on the FDD cell and the information on the TDD cell may be transferred from the base station through system information or higher layer information. In block 512, the mobile station receives scheduling of downlink data in the FDD cell and the TDD cell in sub-frame #n from the base station.

Next, in block 513, the mobile station determines whether sub-frame #n of the TDD cell is an uplink sub-frame. As a result of the determination in block 513, when the sub-frame of the TDD cell is an uplink sub-frame, the process proceeds to block 514. In block 514, the mobile station transmits an HARQ-ACK for a PDSCH received in sub-frame #n of the FDD cell in a corresponding uplink sub-frame of the TDD cell determined based on one of the schemes according to an embodiment. As a result of the determination in block 513, when the sub-frame of the TDD cell is not an uplink sub-frame, the process proceeds to block 515. In block 515, the mobile station transmits an HARQ-ACK for a PDSCH received in sub-frame #n of the FDD cell in an uplink sub-frame of the TDD cell according to HARQ timing defined to match up with the sub-frame #n of the TDD cell.

Some embodiments of the present disclosure in which an HARQ-ACK for a PDSCH in an FDD cell is transmitted in an uplink sub-frame of a TDD cell by using HARQ timing of the TDD cell are different from a situation in which only FDD cells coexist. For example, in a situation in which only FDD cells coexist, whenever a PDSCH is scheduled in a downlink sub-frame, an HARQ-ACK for the PDSCH may be transmitted through an uplink control channel in an uplink sub-frame by four sub-frames after the downlink sub-frame. Therefore, in one uplink sub-frame, an HARQ-ACK for a PDSCH in a downlink sub-frame having another index is not transmitted. However, when a TDD cell and an FDD cell coexist and the TDD cell is configured as a Pcell as described above, the uplink control channel is transmitted only in a Pcell. Therefore, HARQ-ACK feedbacks for PDSCHs scheduled in a plurality of downlink sub-frames in the FDD cell should be transmitted in a single uplink sub-frame of the TDD cell. When a PDSCH is scheduled in the TDD cell, a Downlink Assignment Index (DAI) field is included in a PDCCH, in order to notify of whether a mobile station has missed a PDCCH in a particular downlink sub-frame.

According to an embodiment of the present disclosure, when a TDD cell and an FDD cell coexist, the TDD cell is configured as a Pcell, and the FDD cell is configured as an Scell as described above, a DAI field is included in a PDCCH for scheduling a PDSCH in the FDD cell and a PDCCH transmitted for the PDSCH of the FDD cell is counted and is used for the DAI field. Further, a DAI field is included in a PDCCH transmitted in order to schedule a PUSCH of the FDD cell, and a PDCCH transmitted for the PDSCH of the FDD cell is counted and is used for the DAI field.

Figure 6:
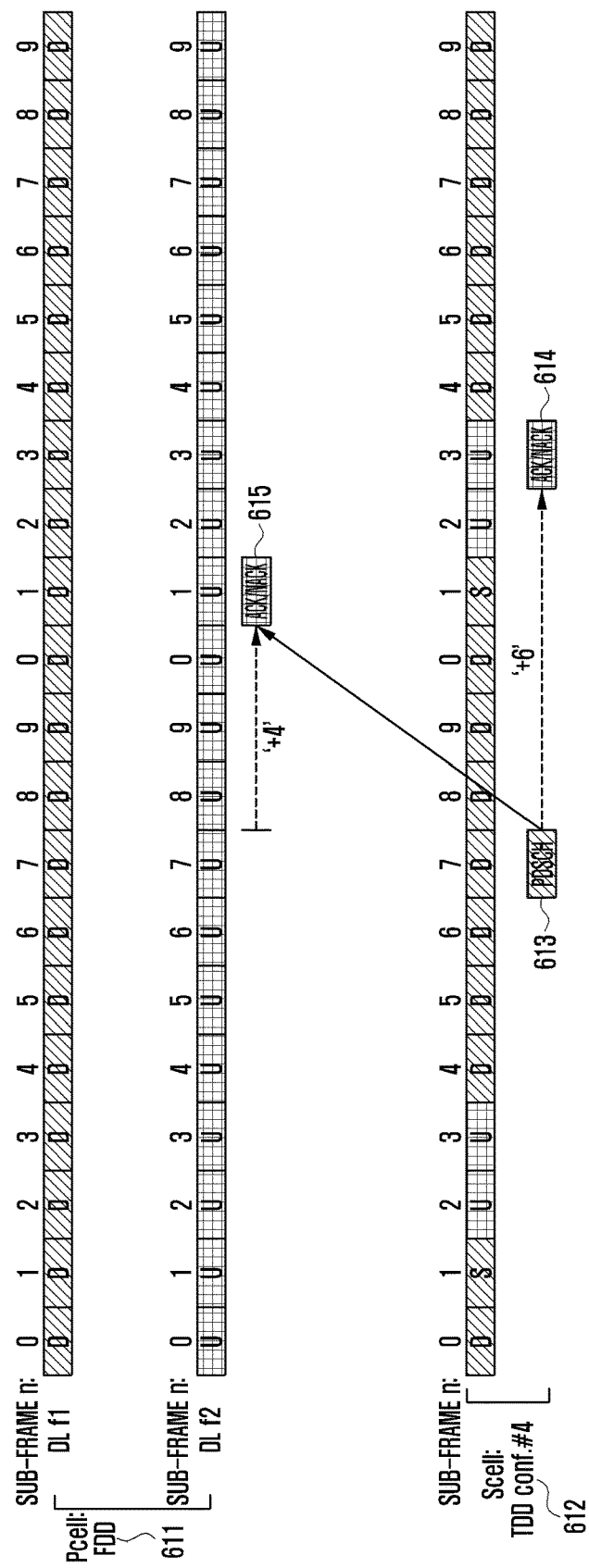
FIG. 6 illustrates a process of control channel transmission according to an embodiment of the present disclosure.

FIG. 6 illustrates a process of control channel transmission according to an embodiment of the present disclosure.

Referring to FIG. 6, the FDD cell 611 is a Pcell and the TDD cell 612 is an Scell. In the embodiments described above with reference to FIGS. 2A to 5B, an FDD cell is an Scell and a TDD cell is a Pcell. However, the embodiment shown in FIG. 6 corresponds to the opposite case. An HARQ-ACK 615 for a PDSCH 613 scheduled in downlink sub-frame #7 of the TDD cell may be transmitted in uplink sub-frame #1 located by four sub-frames thereafter according to the HARQ timing in the FDD cell. Therefore, even though an HARQ-ACK for a PDSCH of a TDD cell is transmitted, HARQ-ACKs for PDSCHs of a plurality of downlink sub-frames of the TDD cell are not transmitted in one uplink sub-frame of an FDD cell. Instead, an HARQ-ACK for a PDSCH of only one downlink sub-frame of the TDD cell is transmitted in one uplink sub-frame. In this event, a DAI field for notifying of whether a mobile station has missed a PDCCH in a particular downlink sub-frame of a TDD cell is unnecessary.

Therefore, when a TDD cell and an FDD cell coexist, the FDD cell is a Pcell, and the TDD cell is an Scell as described above, the DAI field may not be used in a PDCCH for scheduling a PDSCH in the TDD cell. According to a modified embodiment, a DAI field of a PDCCH for scheduling a PDSCH of the TDD cell may be configured as 0. According to another modified embodiment, the PDCCH does not include a DAI field. Further, a PDCCH transmitted in order to schedule a PUSCH of the TDD cell may not use a DAI field or have a DAI field configured as 0. Further, according to another modified embodiment, the PDCCH for scheduling a PUSCH does not include a DAI field.

Figure 7:
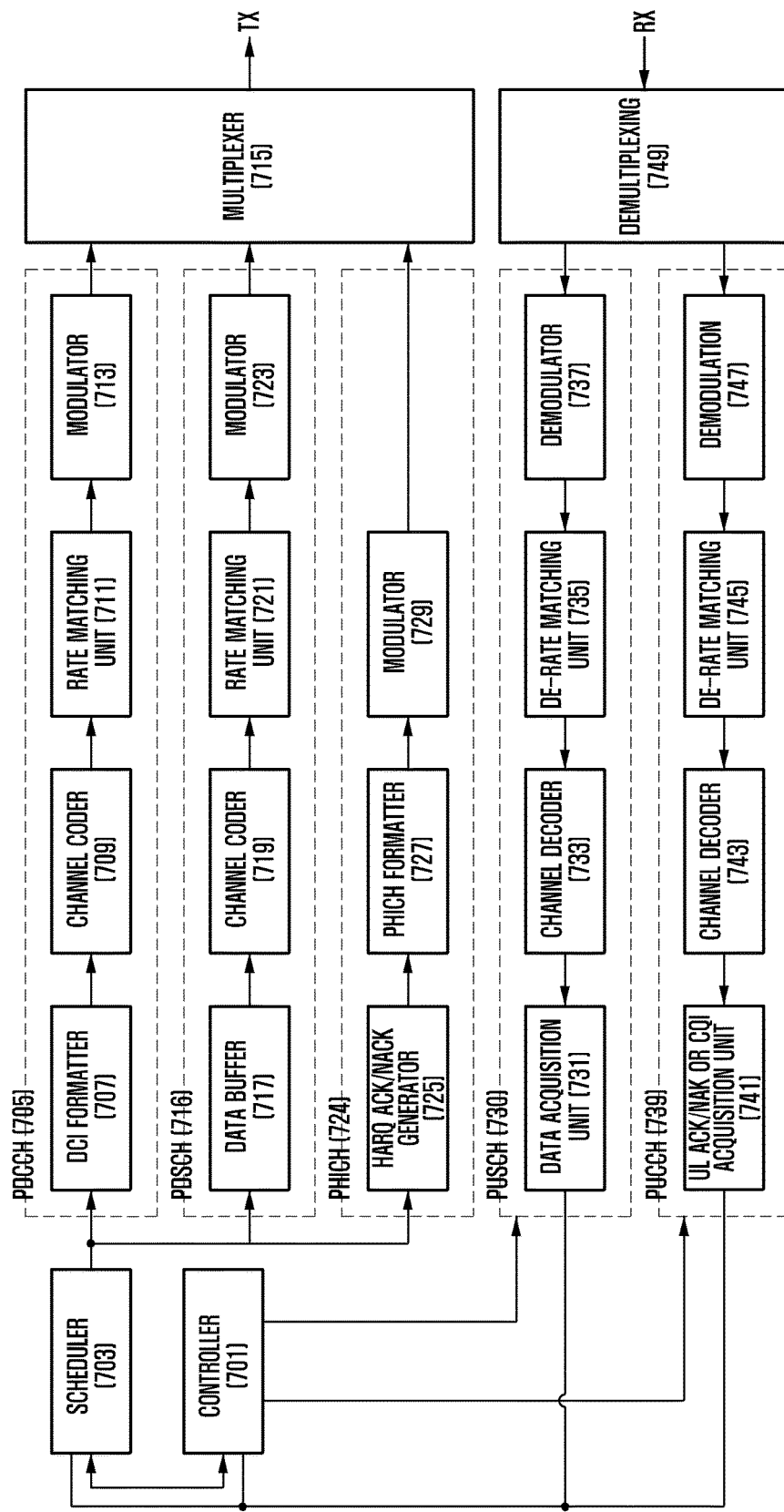
FIG. 7 illustrates a block diagram of a base station according to embodiments of the present disclosure.

FIG. 7 illustrates a block diagram of a base station according to embodiments of the present disclosure. Referring to FIG. 7, the base station apparatus includes a transmission unit, a reception unit, a controller 701, and a scheduler 703. The transmission unit and the reception unit may be collectively referred to as a communication unit. The transmission unit includes a PDCCH block 705, a PDSCH block 716, a PHICH block 724, and a multiplexer 715. The reception unit includes a PUSCH block 730, a PUCCH block 739, and a demultiplexer 749. The controller 701 controls DL/UL HARQ-ACK transmission/reception timing. The DL/UL HARQ-ACK transmission/reception timing includes all of PUCCH transmission timing with respect to PDSCH transmission, PUSCH timing with respect to PDCCH transmission, and UL grant/PHICH timing with respect to PUSCH transmission. For transmission/reception in a plurality of cells, there may be a plurality of transmission units and a plurality of reception units (excluding the PUCCH block). However, for convenience of description, it is assumed that only one transmission unit and only one reception unit exist.

The PDCCH block 705 includes a DCI formatter 707, a channel coder 709, a rate matching unit 711, and a modulator 713. The PDSCH block 716 includes a data buffer 717, a channel coder 719, a rate matching unit 721, and a modulator 723. The PHICH block 724 includes an HARQ ACK/NACK generator 725, a PHICH formatter 727, and a modulator 729. The PUSCH block 730 includes a demodulator 737, a de-rate matching unit 735, a channel decoder 733, and a data acquisition unit 731. The PUCCH block 739 includes a demodulator 747, a de-rate matching unit 745, a channel decoder 743, and an ACK/NAK or CQI acquisition unit 741.

The controller 701, which controls DL/UL HARQ-ACK transmission/reception timing, refers to the quantity of data to be transferred to a mobile station, the quantity of available resources within the system to adjust the timing relation between physical channels for a mobile station to be scheduled and then notifies of the timing relation to the scheduler 703, the PDCCH block 705, the PDSCH block 716, the PHICH block 724, the PUSCH block 730, and the PUCCH block 739. According to one of the embodiments described above with reference to FIGS. 2A to 6, the controller 701 determines the DL/UL HARQ-ACK transmission/reception timing relation.

According to the control of the scheduler 703, the DCI formatter 707 configures a DCI. The channel coder 709 provides an error correction capability to the DCI. The rate matching unit 711 rate-matches the DCI provided with the error correction capability in accordance with the quantity of resources to be actually mapped. The modulator 713 modulates the rate-matched DCI. The multiplexer 715 multiplexes the modulated DCI with other signals.

According to the control of the scheduler 703, data to be transmitted is extracted from the data buffer 717. The channel coder 719 provides an error correction capability to the extracted data. The rate matching unit 721 rate-matches the data provided with the error correction capability in accordance with the quantity of resources to be actually mapped. The modulator 723 modulates the rate-matched data. The multiplexer 715 multiplexes the modulated data with other signals.

According to the control of the scheduler 703, the HARQ ACK/NACK generator 725 generates an HARQ ACK/NACK for a PDSCH received from a mobile station. The PHICH formatter 727 configures the HARQ ACK/NACK in accordance with the PHICH structure. The modulator 729 modulates the configured HARQ ACK/NACK. The multiplexer 715 multiplexes the modulated HARQ ACK/NACK with other signals.

Further, an OFDM signal is generated from the multiplexed signals and is transmitted to the mobile station.

The demultiplexer 749 separates a PUSCH signal from signals received from a mobile station. The demodulator 737 demodulates the PUSCH. The de-rate matching unit 735 reconfigures symbols before rate matching from the demodulated PUSCH signal. The channel decoder 733 decodes the reconfigured symbols. The data acquisition unit 731 acquires PUSCH data from the decoded symbols. The data acquisition unit 731 may notify the scheduler 703 of whether a result of the decoding includes an error, to adjust the downlink HARQ ACK/NACK generation. The information on whether the result of the decoding includes an error is transferred to the controller 701 that controls the DL/UL HARQ-ACK transmission/reception timing, such that the controller 701 adjusts the downlink HARQ ACK/NACK transmission timing.

The demultiplexer 749 separates a PUCCH signal from signals received from a mobile station based on DL/UL HARQ-ACK transmission/reception timing according to an embodiment of the present disclosure. The demodulator 747 demodulates the separated PUCCH signal. The channel decoder 743 decodes the demodulated PUCCH signal. The uplink ACK/NAK or CQI acquisition unit 741 acquires an uplink ACK/NAK or CQI from the decoded PUCCH signal. The acquired uplink ACK/NAK or CQI is provided to the scheduler 703 to be used in determining a Modulation and Coding Scheme (MCS) and whether to retransmit the PDSCH. Further, the acquired uplink ACK/NACK is provided to the controller 701 to adjust the transmission timing of the PDSCH.

Figure 8:
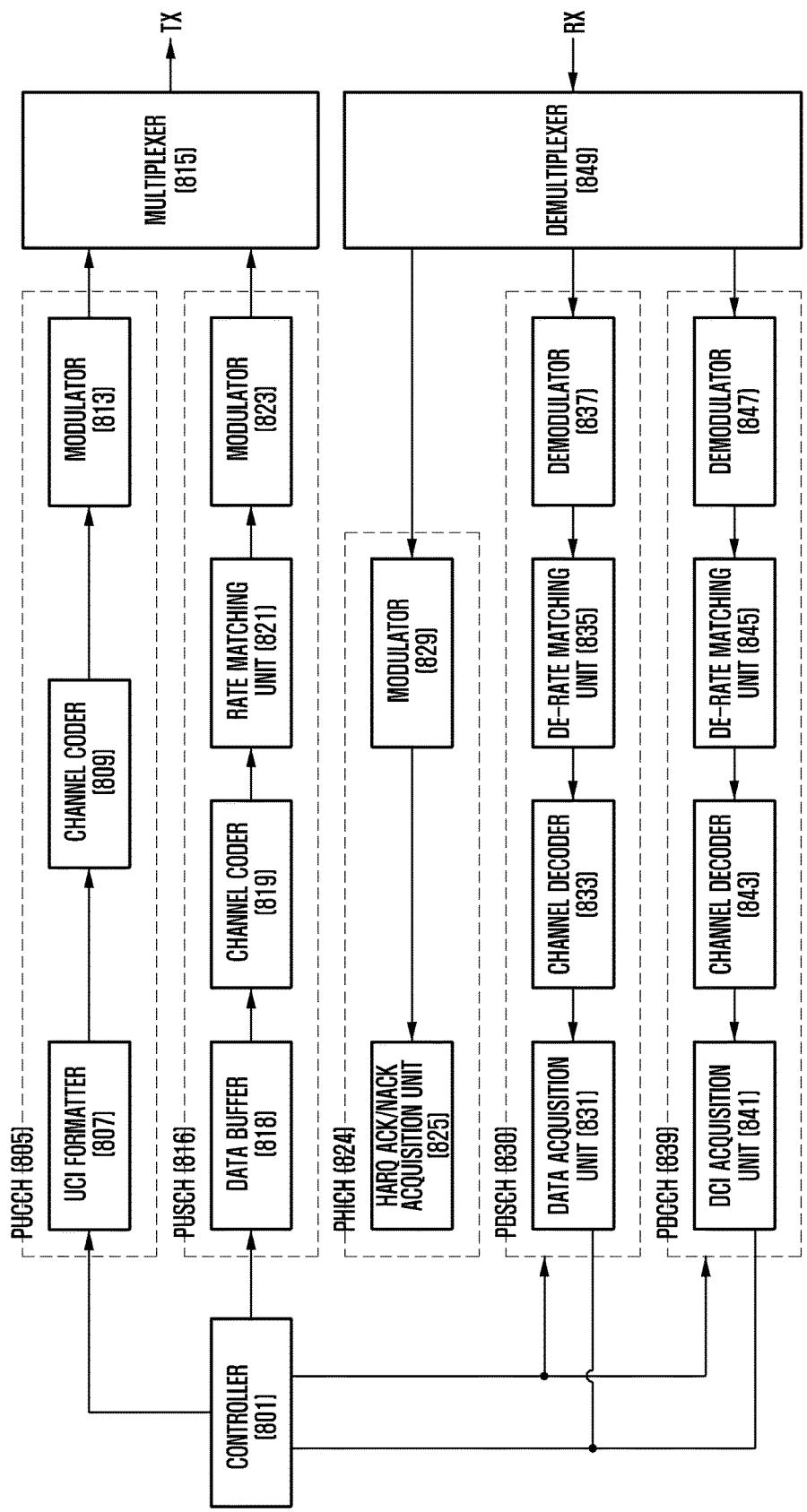
FIG. 8 illustrates a block diagram of a mobile station according to embodiments of the present disclosure.

FIG. 8 illustrates a block diagram of a mobile station according to embodiments of the present disclosure.

Referring to FIG. 8, the mobile station includes a transmission unit, a reception unit, and a controller 801. The transmission unit and the reception unit may be collectively referred to as a communication unit. The transmission unit includes a PUCCH block 805, a PUSCH block 816, and a multiplexer 815. The reception unit includes a PHICH block 824, a PDSCH block 830, a PDCCH block 839, and a demultiplexer 849. The controller 801 controls DL/UL HARQ-ACK transmission/reception timing. The PUCCH block 805 includes a UCI formatter 807, a channel coder 809, and a modulator 813. The PUSCH block 816 includes a data buffer 818, a channel coder 819, a rate matching unit 821, and a modulator 823. The PHICH block 824 includes an HARQ ACK/NACK acquisition unit 825 and a modulator 829. The PDSCH block 830 includes a demodulator 837, a de-rate matching unit 835, a channel decoder 833, and a data acquisition unit 831. The PDCCH block 839 includes a demodulator 847, a de-rate matching unit 845, a channel decoder 843, and a DCI acquisition unit 841. For transmission/reception in a plurality of cells, there may be a plurality of transmission units and a plurality of reception units (excluding the PUCCH block). However, for convenience of description, it is assumed that only one transmission unit and only one reception unit exist.

The controller 801, which controls DL/UL HARQ-ACK transmission/reception timing, obtains information on which cell a PDSCH is to be received from and which cell a PDSCH is to be transmitted to, at the time of self-scheduling or cross carrier scheduling, from a DCI received from a base station, selects a cell for DL/UL HARQ-ACK transmission, adjusts the transmission/reception timing relation between physical channels, and notifies of the obtained information, the selected cell, and the adjusted timing relation to the PUCCH block 805, the PUSCH block 816, the PHICH block 824, the PDSCH block 830, and the PDCCH block 839. The controller 801 determines the DL/UL HARQ-ACK transmission/reception timing relation according to an embodiment of the present disclosure.

The UCI formatter 807 configures an HARQ ACK/NACK or CQI by using Uplink Control Information (UCI) according to the timing control of the controller 801 that controls the DL/UL HARQ-ACK transmission/reception timing. The channel coder 809 provides an error correction capability to the HARQ ACK/NACK or CQI. The modulator 813 modulates the HARQ ACK/NACK or CQI provided with the error correction capability. The multiplexer 815 multiplexes the modulated HARQ ACK/NACK or CQI with other signals.

Data to be transmitted is extracted from the data buffer 818. The channel coder 819 provides an error correction capability to the extracted data. The rate matching unit 821 rate-matches the data provided with the error correction capability in accordance with the quantity of resources to be actually mapped. The modulator 823 modulates the rate-matched data. The multiplexer 815 multiplexes the modulated data with other signals.

Further, a Single Carrier-Frequency Division Multiple Access (SC-FDMA) signal is generated from the multiplexed signals and is transmitted to a base station in consideration of the DL/UL HARQ-ACK transmission/reception timing according to an embodiment of the present disclosure.

The demultiplexer 849 separates a PHICH signal from signals received from a base station according to DL/UL HARQ-ACK transmission/reception timing. The demodulator 829 demodulates the separated PHICH signal. The HARQ ACK/NACK acquisition unit 825 acquires an HARQ ACK/NACK for a PUSCH from the demodulated PHICH signal.

The demultiplexer 849 separates a PDSCH signal from signals received from a mobile station. The demodulator 837 demodulates the separated PDSCH signal. The de-rate matching unit 835 reconfigures symbols before rate matching from the demodulated PDSCH signal. The channel decoder 833 decodes the reconfigured symbols. The data acquisition unit 831 acquires PDSCH data from the decoded symbols. The data acquisition unit 831 notifies the PUCCH block 805 of information on whether a result of the decoding is erroneous, to adjust uplink HARQ ACK/NACK generation, and provides the information to the controller 801 for controlling the DL/UL HARQ-ACK transmission/reception timing, such that the controller 801 adjusts the timing for transmission of the uplink HARQ ACK/NACK.

The demultiplexer 849 separates a PDCCH signal from signals received from a base station. The demodulator 847 demodulates the separated PDCCH signal. The channel decoder 833 decodes the demodulated PDCCH signal. The DCI acquisition unit 841 acquires DCI from the decoded PDCCH signal.

Although the embodiments described above are based on an example of HARQ-ACK/NACK, embodiments of the present disclosure can be applied to other feedback signals similar to the HARQ-ACK/NACK. Further, in the embodiments described above, a mobile station transmits a feedback of a PDSCH after receiving the PDSCH. However, embodiments of the present disclosure can be applied to other similar data or signals also.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method by a terminal connected with a base station through a primary cell (PCell) of a time division duplex (TDD) scheme and a secondary cell (SCell) of a frequency division duplex (FDD) scheme, the method comprising:
   monitoring a physical downlink control channel (PDCCH) or enhanced PDCCH (ePDCCH) on the SCell;
   receiving data on the SCell in at least one downlink subframe based on scheduling information in the PDCCH or in the ePDCCH; and
   transmitting, on the PCell in a feedback subframe, a feedback of the data received in the at least one downlink subframe,
   wherein a physical uplink control channel (PUCCH) format 1b with channel selection is not supported for transmitting the feedback if a predetermined TDD uplink-downlink (UL-DL) configuration is configured for the PCell.

2. The method of claim 1, wherein the predetermined TDD UL-DL configuration comprises at least one of TDD UL-DL configuration 2, TDD UL-DL configuration 3, TDD UL-DL configuration 4 and TDD UL-DL configuration 5.

3. The method of claim 1, wherein the predetermined TDD UL-DL configuration requires that the feedback subframe includes the feedback corresponding to the data received for more than four downlink subframes.

4. The method of claim 1, wherein the feedback of the data received in the at least one downlink subframe is transmitted using a PUCCH format 3 if the predetermined TDD UL-DL configuration is configured for the PCell.

5. A terminal connected with a base station through a primary cell (PCell) operating in a time division duplex (TDD) mode and a secondary cell (Scell) operating in a frequency division duplex (FDD) mode, the terminal comprising:
   a transceiver configured to transmit and receive signals; and
   at least one processor configured to control:
   monitoring physical downlink control channel (PDCCH) or enhanced PDCCH (ePDCCH) on the SCell;
   receiving data on the SCell in at least one downlink subframe based on scheduling information in the PDCCH or in the ePDCCH; and
   transmitting, on the PCell in a feedback subframe, a feedback of the data received in the at least one downlink subframe,
   wherein a physical uplink control channel (PUCCH) format 1b with channel selection is not supported for transmitting the feedback if a predetermined TDD uplink-downlink (UL-DL) configuration is configured for the PCell.

6. The terminal of claim 5, wherein the predetermined TDD UL-DL configuration comprises at least one of TDD UL-DL configuration 2, TDD UL-DL configuration 3, TDD UL-DL configuration 4 and TDD UL-DL configuration 5.

7. The terminal of claim 5, wherein the predetermined TDD UL-DL configuration requires that the feedback subframe includes the feedback corresponding to the data received for more than four downlink subframes.

8. The terminal of claim 5, wherein the feedback of the data received in the at least one downlink subframe is transmitted using a PUCCH format 3 if the predetermined TDD UL-DL configuration is configured for the PCell.

9. A method by a base station connected with a terminal through a primary cell (PCell) of a time division duplex (TDD) scheme and a secondary cell (SCell) of a frequency division duplex (FDD) scheme, the method comprising:
   transmitting physical downlink control channel (PDCCH) or enhanced PDCCH (ePDCCH) on the SCell to the terminal;
   transmitting data on the SCell in at least one downlink subframe based on scheduling information in the PDCCH or in the ePDCCH; and
   receiving, on the PCell in a feedback subframe, a feedback of the data transmitted in the at least one downlink subframe,
   wherein a physical uplink control channel (PUCCH) format 1b with channel selection is not supported for transmitting the feedback if a predetermined TDD uplink-downlink (UL-DL) configuration is configured for the PCell.

10. The method of claim 9, wherein the predetermined TDD UL-DL configuration comprises at least one of TDD UL-DL configuration 2, TDD UL-DL configuration 3, TDD UL-DL configuration 4 and TDD UL-DL configuration 5.

11. The method of claim 9, wherein the predetermined TDD UL-DL configuration requires that the feedback subframe includes the feedback corresponding to the data transmitted for more than four downlink subframes.

12. The method of claim 9, wherein the feedback of the data transmitted in the at least one downlink subframe is transmitted using a PUCCH format 3 if the predetermined TDD UL-DL configuration is configured for the PCell.

13. A base station connected with a terminal through a primary cell (PCell) operating in a time division duplex (TDD) mode and a secondary cell (SCell) operating in a frequency division duplex (FDD) mode, the base station comprising:
a transceiver configured to transmit and receive signals; and
at least one processor configured to control:
transmitting physical downlink control channel (PDCCH) or enhanced PDCCH (ePDCCH) on the SCell to the terminal;
transmitting data on the SCell in at least one downlink subframe based on scheduling information in the PDCCH or in the ePDCCH; and
receiving, on the PCell in a feedback subframe, a feedback of the data transmitted in the at least one downlink subframe,
wherein a physical uplink control channel (PUCCH) format 1b with channel selection is not supported for transmitting the feedback if a predetermined TDD uplink-downlink (UL-DL) configuration is configured for the PCell.

14. The base station of claim 13, wherein the predetermined TDD UL-DL configuration comprises at least one of TDD UL-DL configuration 2, TDD UL-DL configuration 3, TDD UL-DL configuration 4 and TDD UL-DL configuration 5.

15. The base station of claim 13, wherein the predetermined TDD UL-DL configuration requires that the feedback subframe includes the feedback corresponding to the data transmitted for more than four downlink subframes.

16. The base station of claim 13, wherein the feedback of the data transmitted in the at least one downlink subframe is transmitted using a PUCCH format 3 if the predetermined TDD UL-DL configuration is configured for the PCell.

* * * * *